United States Patent
Fujimoto et al.

(10) Patent No.: US 10,351,122 B2
(45) Date of Patent: Jul. 16, 2019

(54) VEHICLE CONTROL APPARATUS AND VEHICLE CONTROL METHOD

(71) Applicant: TOYOTA JIDOSHA KABUSHIKI KAISHA, Toyota-shi, Aichi-ken (JP)

(72) Inventors: Akihiro Fujimoto, Susono (JP); Wan Leng Ang, Gotenba (JP); Yu Miyahara, Susono (JP); Yuji Iwase, Mishima (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 84 days.

(21) Appl. No.: 15/475,774

(22) Filed: Mar. 31, 2017

(65) Prior Publication Data

US 2017/0282890 A1 Oct. 5, 2017

(30) Foreign Application Priority Data

Apr. 4, 2016 (JP) .................. 2016-075102

(51) Int. Cl.
*B60W 20/00* (2016.01)
*B60K 6/445* (2007.10)
(Continued)

(52) U.S. Cl.
CPC ............. *B60W 20/00* (2013.01); *B60K 6/445* (2013.01); *B60K 6/48* (2013.01); *B60W 10/06* (2013.01); *B60W 10/08* (2013.01); *F02D 41/009* (2013.01); *F02N 19/005* (2013.01); *G05B 13/0205* (2013.01); *B60W 2050/001* (2013.01); *B60W 2050/0014* (2013.01); *B60W 2710/06* (2013.01); *B60W 2710/08* (2013.01); *F02N 2019/008* (2013.01); *F02N 2200/021* (2013.01);
(Continued)

(58) Field of Classification Search
None
See application file for complete search history.

(56) References Cited

U.S. PATENT DOCUMENTS

2004/0149247 A1* 8/2004 Kataoka ................ F02N 11/006
 123/179.4
2007/0233357 A1* 10/2007 Sugai ....................... B60K 6/48
 701/105
(Continued)

FOREIGN PATENT DOCUMENTS

JP 2011-219019 A 11/2011
JP 2012-224283 A 11/2012

*Primary Examiner* — Tamara L Weber
(74) *Attorney, Agent, or Firm* — Hunton Andrews Kurth LLP

(57) ABSTRACT

A vehicle control apparatus includes an electronic control unit. The electronic control unit is configured to perform feedback control of a motor such that a torque is output for stopping a crankshaft at a target angle. A first angle is used as the target angle during a first period from start of the feedback control to first detection of rotation of the crankshaft in a negative rotational direction for returning the crank angle. A second angle is used as the target angle during a second period from the lapse of the first period to detection of a changeover in a rotational direction of the crankshaft from the negative to a positive rotational direction. The electronic control unit is configured to return the target angle to the first angle at a first timing after the lapse of the second period.

11 Claims, 13 Drawing Sheets

(51) Int. Cl.
  *B60W 10/06*   (2006.01)
  *B60W 10/08*   (2006.01)
  *F02D 41/00*   (2006.01)
  *F02N 19/00*   (2010.01)
  *B60K 6/48*    (2007.10)
  *G05B 13/02*   (2006.01)
  *B60W 50/00*   (2006.01)

(52) U.S. Cl.
  CPC .............................. *F02N 2300/104* (2013.01); *F02N 2300/2004* (2013.01)

(56) References Cited

U.S. PATENT DOCUMENTS

2014/0074333 A1* 3/2014 Ohkuma ................ B60K 6/445
                                                     701/22
2016/0017856 A1* 1/2016 Tsukada ................ B60W 20/40
                                                     701/112

* cited by examiner

VEHICLE CONTROL APPARATUS AND VEHICLE CONTROL METHOD

INCORPORATION BY REFERENCE

The disclosure of Japanese Patent Application No. 2016-075102 filed on Apr. 4, 2016 including the specification, drawings and abstract is incorporated herein by reference in its entirety.

BACKGROUND

1. Technical Field

The present disclosure relates to a vehicle control apparatus and a vehicle control method that can stop a crankshaft at a desired position when an engine stops.

2. Description of Related Art

Japanese Patent Application Publication No. 2011-219019 (JP 2011-219019 A) discloses a vehicle control apparatus that can stop a crankshaft with a crank angle equal to a target angle when an engine stops. The vehicle control apparatus described in Japanese Patent Application Publication No. 2011-219019 (JP 2011-219019 A) controls a motor such that a torque capable of stopping the crankshaft with the crank angle equal to the target angle is output from the motor to the crankshaft.

SUMMARY

A vehicle control apparatus performs feedback control of a motor based on a difference between a current crank angle and a target angle, with a view to stopping a crankshaft with a crank angle equal to a target angle. In concrete terms, the vehicle control apparatus performs feedback control of the motor in such a manner as to output a torque that counterbalances an inertial force in a positive rotational direction of the crankshaft (i.e., a torque that acts in a negative rotational direction), based on the difference between the current crank angle and the target angle. As a result, the vehicle control apparatus stops the crankshaft that rotates in the positive rotational direction, with the crank angle equal to the target angle. It should be noted herein that when the response speed of feedback control is an ideal response speed (e.g., the response delay is equal to zero), the vehicle control apparatus can stop the crankshaft with the crank angle remaining equal to the target angle instead of exceeding the target angle. In reality, however, it is difficult to make the response speed of feedback control equal to the ideal response speed. Therefore, there may arise a situation where the crank angle becomes larger than the target angle because the inertial force in the positive rotational direction of the crankshaft cannot be counterbalanced even at a time point when the crank angle becomes equal to the target angle, as a result of the responsiveness of feedback control. That is, a so-called overshoot of the crank angle in the positive rotational direction with respect to the target angle may occur.

This overshoot of the crank angle can be a cause of the following state when an attempt is made to stop the crankshaft under the circumstances where valves that control the flow of air out of/into an engine (i.e., an intake valve and an exhaust valve) are in a closed-valve state.

In concrete terms, when the crank angle becomes larger than the target angle, the vehicle control apparatus controls the motor in such a manner as to output a torque capable of returning the crank angle, which has become larger than the target angle, toward the target angle by rotating the crankshaft in the negative rotational direction. It should be noted, however, that the valves of the engine are in the closed-valve state. Therefore, the pressure of the air in a cylinder has risen by a value corresponding to the overshoot amount of the crank angle. In this case, the pressure of the air in the cylinder acts on a piston as soon as the inertial force in the positive rotational direction of the crankshaft is counterbalanced. As a result, the crankshaft can rotate in the negative rotational direction as a matter of course. Accordingly, the vehicle control apparatus controls the motor in such a manner as to output a torque capable of rotating the crankshaft in the positive rotational direction, with a view to returning the crank angle toward the target angle by controlling the amount of rotation of the crankshaft in the negative rotational direction resulting from the pressure of the air in the cylinder.

Even under the circumstances where the crank angle that has become larger than the target angle is returned toward the target angle, there may arise a situation where the crank angle becomes smaller than the target angle because the crankshaft is not stopped from rotating in the negative rotational direction at a timing when the crank angle becomes equal to the target angle, as a result of the responsiveness of feedback control. That is, an overshoot of the crank angle in the negative rotational direction with respect to the target angle occurs. In this case, the vehicle control apparatus controls the motor in such a manner as to output a torque capable of returning the crank angle, which has become smaller than the target angle, toward the target angle by rotating the crankshaft in the positive rotational direction. As a result, the crankshaft stops with the crank angle equal to the target angle.

It should be noted that the possibility of the occurrence of a situation where the crank angle becomes smaller than the target angle increases as the rotation amount of the crankshaft in the negative rotational direction for returning the crank angle, which has become larger than the target angle, toward the target angle increases. In particular, the possibility of the overshoot amount of the crank angle in the negative rotational direction with respect to the target angle becoming large increases as the rotation amount of the crankshaft in the negative rotational direction increases. The rotation amount of the crankshaft in the positive rotational direction for returning the crank angle, which has become smaller than the target angle, toward the target angle also increases as the overshoot amount of the crank angle in the negative rotational direction with respect to the target angle increases. As a result, the force that is exerted on the piston by the air in the cylinder when the crankshaft is stopped (substantially the pressure of the air in the cylinder) also increases as the rotation amount of the crankshaft in the positive rotational direction immediately before the stop of the crankshaft increases. For example, in the case where the crankshaft rotates in such a manner as to compress the air in the cylinder immediately before stopping, the force with which the air in the cylinder pushes out the piston (substantially the positive pressure of the air in the cylinder) becomes large. For example, in the case where the crankshaft rotates in such a manner as to expand the air in the cylinder immediately before stopping, the force with which the air in the cylinder pulls the piston (substantially the negative pressure of the air in the cylinder) becomes large.

In the case where the crankshaft has stopped under the circumstances where the force that is exerted on the piston by this air in the cylinder is relatively large, the piston may move (i.e., the crankshaft may move) as a result of the pressure of the air in the cylinder after a torque is stopped from being output from the motor due to the stop of the crankshaft. As a result, it may be difficult to stop the crankshaft with the crank angle equal to the target angle.

The disclosure provides a vehicle control apparatus and a vehicle control method that can stop a crankshaft with a crank angle equal to a target angle even in the case where an overshoot of the crank angle with respect to the target angle occurs as a result of the responsiveness of feedback control before stopping the crankshaft.

A first aspect of the disclosure is a vehicle control apparatus for a vehicle. The vehicle includes an engine and a motor. The engine includes at least one cylinder, a valve and a crankshaft. The valve is configured to control flow of air out of and into the at least one cylinder. The motor is configured to adjust a crank angle of the crankshaft by outputting a torque to the crankshaft. The vehicle control apparatus includes an electronic control unit. The electronic control unit is configured to perform feedback control of the motor, during stop control of the engine, based on the crank angle such that the torque is output for stopping the crankshaft at a target angle corresponding to the crank angle at which the valve is in a closed-valve state. The electronic control unit is configured to detect a rotational direction of the crankshaft. The electronic control unit is configured to use a first angle as the target angle during a first period. The first period is a period from start of the feedback control to a timing of first detection of rotation of the crankshaft in a negative rotational direction for returning the crank angle, which has become larger than the target angle, toward the target angle. The first angle corresponding to the crank angle at which the valve is in the closed-valve state. The electronic control unit is configured to use a second angle as the target angle during a second period. The second period is a period from lapse of the first period to a timing of detection of a changeover in a rotational direction of the crankshaft from the negative rotational direction to a positive rotational direction. The second angle is larger than the first angle. The electronic control unit is configured to return the target angle from the second angle to the first angle at a first timing. The first timing is a timing when the crank angle, that has become smaller than the first angle during the second period, becomes equal to or larger than the first angle after lapse of the second period.

In the vehicle control apparatus, the electronic control unit may be configured to use the second angle as the target angle during a third period. The third period may be a period from a timing of second detection of rotation of the crankshaft in the negative rotational direction for returning the crank angle, which has become larger than the target angle for the second time after returning the target angle to the first angle, toward the target angle to a timing of detection of a changeover in the rotational direction of the crankshaft from the negative rotational direction to the positive rotational direction. The electronic control unit may be configured to return the target angle from the second angle to the first angle at a second timing. The second timing may be a timing when the crank angle, which has become smaller than the first angle during the third period, becomes equal to or larger than the first angle after lapse of the third period.

In the vehicle control apparatus, the electronic control unit may be configured to use the second angle as the target angle during the second period. The second angle may gradually increase from the first angle and then gradually decrease toward the first angle.

In the vehicle control apparatus, the first angle may be the crank angle in a latter half of a compression stroke.

A second aspect of the disclosure is a vehicle control apparatus for a vehicle. The vehicle includes an engine and a motor. The engine includes at least one cylinder, a valve and a crankshaft. The valve is configured to control flow of air out of and into the at least one cylinder. The motor is configured to adjust a crank angle of the crankshaft by outputting a torque to the crankshaft. The vehicle control apparatus includes an electronic control unit. The electronic control unit is configured to perform feedback control of the motor, during stop control of the engine, based on the crank angle such that the torque is output for stopping the crankshaft at a target angle corresponding to the crank angle at which the valve is in a closed-valve state. The electronic control unit is configured to detect a rotational direction of the engine. The electronic control unit is configured to use a first gain, during a first period, as a motor gain that prescribes a magnitude of the torque. The first period is a period from start of the feedback control to a timing of first detection of rotation of the crankshaft in a negative rotational direction for returning the crank angle, which has become larger than the target angle, toward the target angle. The electronic control unit is configured to use a second gain as the motor gain during a second period. The second period is a period from lapse of the first period to a timing of detection of a changeover in a rotational direction of the crankshaft from the negative rotational direction to a positive rotational direction. The second gain is a gain that prescribes a larger torque in the positive rotational direction than the first gain. The electronic control unit is configured to return the motor gain from the second gain to the first gain at a first timing. The first timing is a timing when the crank angle, which has become smaller than the target angle during the second period, becomes equal to or larger than the target angle after lapse of the second period.

In the vehicle control apparatus, the electronic control unit may be configured to use the second gain as the motor gain during a third period. The third period may be a period from a timing of second detection of rotation of the crankshaft in the negative rotational direction for returning the crank angle, which has become larger than the target angle for the second time after returning the motor gain to the first gain, toward the target angle to a timing of detection of a changeover in the rotational direction of the crankshaft from the negative rotational direction to the positive rotational direction. The electronic control unit may be configured to return the motor gain from the second gain to the first gain at a second timing. The second timing may be a timing when the crank angle, which has become smaller than the target angle during the third period, becomes equal to or larger than the target angle after lapse of the third period.

In the vehicle control apparatus, the electronic control unit may be configured to use the second gain as the motor gain during the second period. The second gain may be a gain that gradually increases from the first gain and then gradually decreases toward the first gain. The second gain may be a gain that gradually decreases from the first gain and then gradually increases toward the first gain.

In the vehicle control apparatus, the target angle may be the crank angle in a latter half of a compression stroke.

A third aspect of the disclosure is a vehicle control method for a vehicle. The vehicle includes an engine and a motor. The engine includes at least one cylinder, a valve and a crankshaft. The valve is configured to control flow of air out of and into the at least one cylinder. The motor is configured to adjust a crank angle of the crankshaft by outputting a torque to the crankshaft. The vehicle control method includes: performing feedback control of the motor, during stop control of the engine, based on the crank angle such that the torque is output for stopping the crankshaft with the crank angle equal to a target angle corresponding to the crank angle at which the valve is in a closed-valve state; using a first angle as the target angle during a first period; using a second angle as the target angle during a second period; and returning the target angle from the second angle to the first angle at a first timing. The first period is a period from start of the feedback control to a timing of first detection of rotation of the crankshaft in a negative rotational direction for returning the crank angle, which has become larger than the target angle, toward the target angle. The first angle is corresponding to the crank angle at which the valve is in the closed-valve state. The second period is a period from lapse of the first period to a timing detection of a changeover in a rotational direction of the crankshaft from the negative rotational direction to a positive rotational direction. The second angle is larger than the first angle. The first timing is a timing when the crank angle, which has become smaller than the first angle during the second period, becomes equal to or larger than the first angle after lapse of the second period.

A fourth aspect of the disclosure is a vehicle control method for a vehicle. The vehicle includes an engine and a motor. The engine includes at least one cylinder, a valve and a crankshaft. The valve is configured to control flow of air out of and into the at least one cylinder. The motor is configured to adjust a crank angle of the crankshaft by outputting a torque to the crankshaft. The vehicle control method includes: performing feedback control of the motor, during stop control of the engine, based on the crank angle such that the torque is output for stopping the crankshaft at a target angle corresponding to the crank angle at which the valve is in a closed-valve state; using a first gain, during a first period, as a motor gain that prescribes a magnitude of the torque; using a second gain as the motor gain during a second period; and returning the motor gain from the second gain to the first gain at a first timing. The first period is a period from start of the feedback control to a timing of first detection of rotation of the crankshaft in a negative rotational direction for returning the crank angle, which has become larger than the target angle, toward the target angle. The second period is a period from lapse of the first period to a timing of detection of a changeover in a rotational direction of the crankshaft from the negative rotational direction to a positive rotational direction. The second gain is a gain that prescribes a larger torque in the positive rotational direction than the first gain. The first timing is a timing when the crank angle, which has become smaller than the target angle during the second period, becomes equal to or larger than the target angle after lapse of the second period.

BRIEF DESCRIPTION OF THE DRAWINGS

Features, advantages, and technical and industrial significance of an exemplary embodiment will be described below with reference to the accompanying drawings, in which like numerals denote like elements, and wherein.

DETAILED DESCRIPTION OF EMBODIMENT

A vehicle control apparatus according to the embodiment of the disclosure will be described hereinafter with reference to the drawings.

Figure 1:
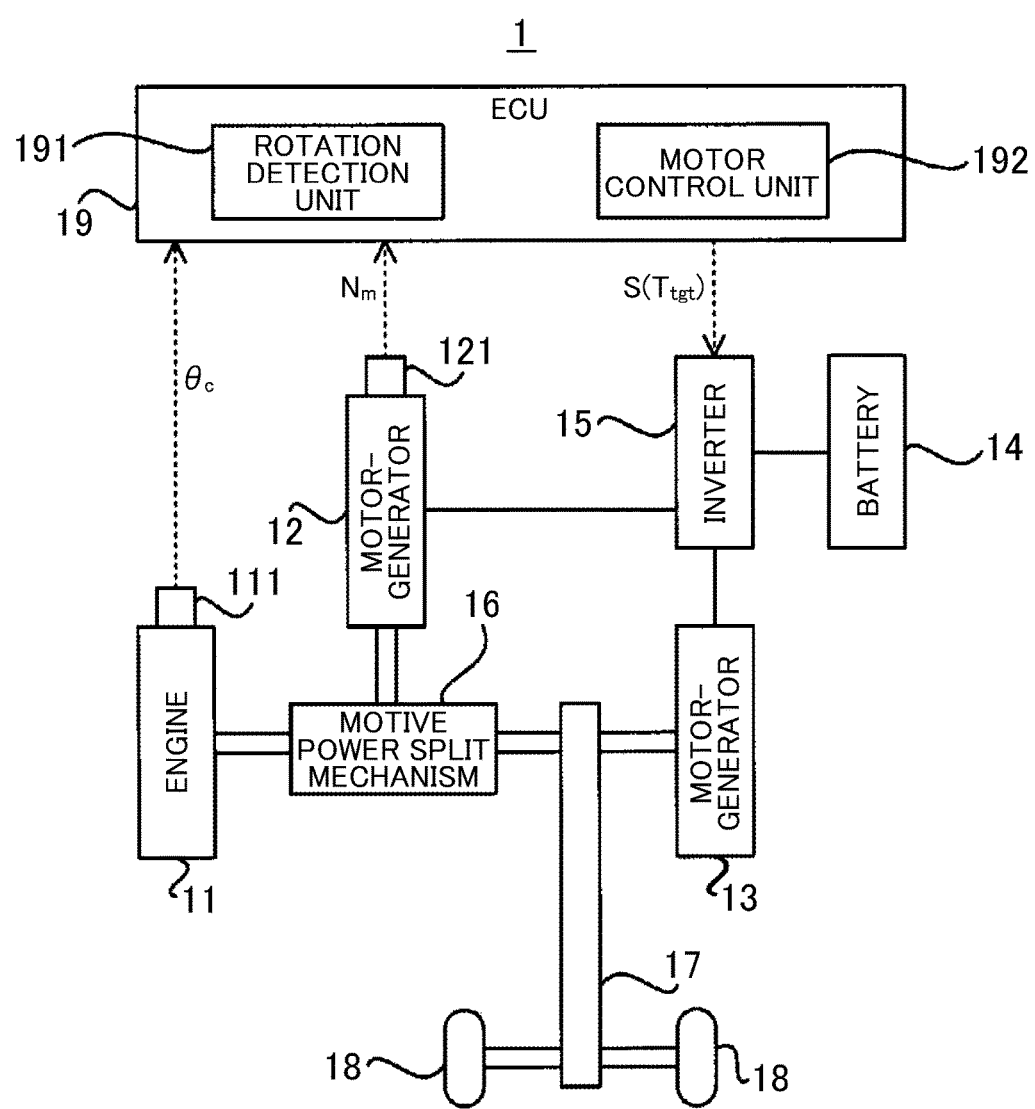
FIG. 1 is a block diagram showing the configuration of a vehicle according to the present embodiment.

First of all, the configuration of a vehicle 1 according to the present embodiment will be described with reference to the block diagram of FIG. 1. As shown in FIG. 1, the vehicle 1 is equipped with an engine 11, a motor-generator 12, a motor-generator 13, a battery 14, an inverter 15, a motive power split mechanism 16, an axle 17, wheels 18 and an electronic control unit (an ECU) 19.

The engine 11 is driven through the combustion of fuel such as gasoline, light oil or the like. The engine 11 functions as a main motive power source of the vehicle 1. A crank angle sensor 111 is attached to the engine 11. The crank angle sensor 111 detects a crank angle $\theta_c$ of a crankshaft of the engine 11. The crank angle sensor 111 outputs the detected crank angle $\theta_c$ to the ECU 19.

The motor-generator 12 functions as a generator for charging the battery 14. In the case where the motor-generator 12 functions as a generator, a rotary shaft of the motor-generator 12 rotates through the motive power of the engine 11. In addition, the motor-generator 12 can rotate the crankshaft by being driven through the use of the electric power that is supplied from the battery 14 via the inverter 15. The motor-generator 12 mainly outputs a torque $T_m$ to the crankshaft such that the crankshaft stops (i.e., the engine 11 stops) with the crank angle $\theta_c$ equal to a target stop angle $\theta_{tgt}$, in stopping the engine 11.

A rotational speed sensor 121 is attached to the motor-generator 12. The rotational speed sensor 121 detects a rotational speed of the motor-generator 12 (hereinafter referred to as "a motor rotational speed") $N_m$. The rotational speed sensor 121 outputs the detected motor rotational speed $N_m$ to the ECU 19.

The motor-generator 13 functions as an electric motor that supplies a motive power of the vehicle 1, by being driven through the use of the electric power that is supplied from the battery 14 via the inverter 15.

The battery 14 is an electric power supply source that supplies each of the motor-generators 12, 13 with an electric power for driving each of the motor-generators 12, 13. The battery 14 is a rechargeable storage battery.

The inverter 15 converts a DC electric power taken out from the battery 14 into an AC electric power, and supplies this AC electric power to each of the motor-generators 12, 13. Furthermore, the inverter 15 converts an AC electric power generated by the motor-generator 12 into a DC electric power, and supplies this DC electric power to the battery 14.

The motive power split mechanism 16 is a planetary gear mechanism that is equipped with a sun gear (not shown), a planetary carrier (not shown), a pinion gear (not shown) and a ring gear (not shown). A rotary shaft of the sun gear is coupled to the rotary shaft of the motor-generator 12. A rotary shaft of the ring gear is coupled to the axle 17 that transmits a driving force to the wheels 18. Furthermore, the axle 17 is coupled to a rotary shaft of the motor-generator 13 via a reduction gear (not shown). A rotary shaft of the planetary carrier, which is located between the sun gear and the ring gear, is coupled to the crankshaft. Rotation of the engine 11 is transmitted to the sun gear and the ring gear by the planetary carrier and the pinion gear. That is, the motive power of the engine 11 is distributed to two systems.

The ECU 19 is configured to be able to control the entire operation of the vehicle 1. In the present embodiment, the ECU 19 carries out a crank stop operation in particular. The crank stop operation is an operation of controlling the motor-generator 12 in such a manner as to output, to the crankshaft, the torque $T_m$ capable of stopping the crankshaft with the crank angle $\theta_c$ equal to the target stop angle $\theta_{tgt}$, in stopping the engine 11.

In order to carry out the crank stop operation, the ECU 19 is equipped with a rotation detection unit 191 and a motor control unit 192, as logical or physical processing blocks that are realized therein. The rotation detection unit 191 detects a rotational direction of the crankshaft, based on the crank angle $\theta_c$ that is output by the crank angle sensor 111. The motor control unit 192 generates a torque command value $T_{tgt}$ indicating a target value of the torque $T_m$ based on a detection result of the rotation detection unit 191, the crank angle $\theta_c$, the motor rotational speed $N_m$ and the target stop angle $\theta_{tgt}$. The torque command value $T_{tgt}$ indicates the torque $T_m$ capable of stopping the crankshaft with the crank angle $\theta_c$ equal to the target stop angle $\theta_{tgt}$. The ECU 19 outputs a switching control signal S corresponding to the torque command value $T_{tgt}$ to the inverter 15. The switching state of a switching element with which the inverter 15 is equipped is changed over in accordance with the switching control signal S. As a result, the motor-generator 12 outputs the torque $T_m$ corresponding to the torque command value $T_{tgt}$.

Subsequently, the crank stop operation will be described. In the present embodiment, the ECU 19 can carry out at least one of first to third examples of the crank stop operation. Accordingly, the first to third examples of the crank stop operation will be described hereinafter sequentially.

The flow of the first example of the crank stop operation will be described with reference to the flowchart of FIG. 2.

Figure 2:
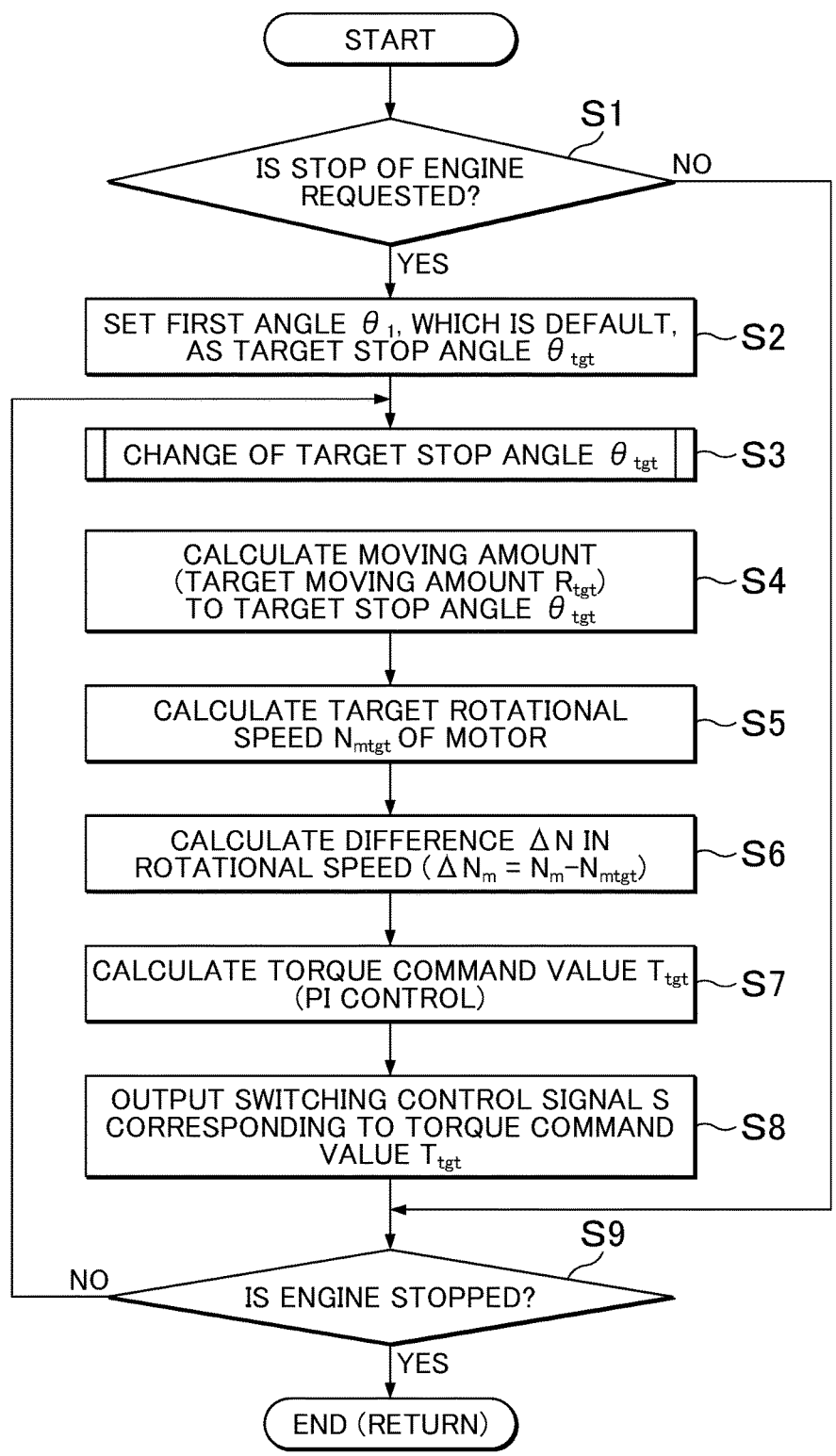
FIG. 2 is a flowchart showing the flow of a first example of a crank stop operation.

As shown in FIG. 2, the motor control unit 192 first determines whether or not the stop of the engine 11 is requested (step S1). The stop of the engine 11 may be requested by a driver of the vehicle 1, or may be requested through the control of the ECU 19 in consideration of the running state of the vehicle 1.

When it is determined as a result of the determination in step S1 that the stop of the engine 11 is not requested (No in step S1), the ECU 19 ends the crank stop operation. In this case, the ECU 19 may restart the crank stop operation shown in FIG. 2 after the lapse of a first time.

On the other hand, when it is determined as a result of the determination in step S1 that the stop of the engine 11 is requested (Yes in step S1), the ECU 19 starts a stop control operation for stopping the engine 11. In concrete terms, the ECU 19 controls a fuel injection device in such a manner as to stop the supply of fuel to the engine 11. In parallel with the stop control operation, the motor control unit 192 sets a first angle $\theta_1$ as a target stop angle $\theta_{tgt}$ (step S2). The first angle $\theta_1$ is a parameter that is stored in advance by the ECU 19 as the default target stop angle $\theta_{tgt}$.

The first angle $\theta_1$ may be an angle at which a desired technical effect can be obtained through the stop of the crankshaft with the crank angle $\theta_c$ equal to the first angle $\theta_1$. For example, the first angle $\theta_1$ may be an angle that can be assumed by the crank angle $\theta_c$ in the latter half of a compression stroke (e.g., the crank angle $\theta_c$ corresponds to an angle that is larger than BTDC 0° and smaller than BTDC 90°). For example, the first angle $\theta_1$ may be an angle that can be assumed by the crank angle $\theta_c$ in the vicinity of an end of a compression stroke (e.g., the crank angle $\theta_c$ corresponds to an angle that is larger than BTDC 0° and smaller than BTDC 10°). In this case, a technical effect of reducing vibrations and noise in restarting the stopped engine 11 is obtained.

In addition, the first angle $\theta_1$ corresponds to the crank angle $\theta_c$ in the case where valves (i.e., an intake valve and an exhaust valve) that are installed in at least one of cylinders of the engine 11 to control the flow of air out of/into the at least one of the cylinders are in a closed-valve state. It should be noted herein that "the closed-valve state" in the present embodiment includes not only a state where the valves are completely closed (i.e., the outflow/inflow of air is completely blocked) but also a state where the change in the pressure of the air in the cylinder resulting from rotation of the crankshaft increases by a predetermined amount or more since the outflow/inflow of air is mostly blocked although the outflow/inflow of air via the valves is not completely blocked. In concrete terms, the state where the change in the pressure of the air in the cylinder increases by the predetermined amount or more means a state where the pressure of the air in the cylinder that has changed as a result of rotation of the crankshaft becomes so high as to push down or pull up a piston. The angle that can be assumed by the crank angle $\theta_c$ in the latter half of the above-mentioned compression stroke corresponds to the crank angle $\theta_c$ in the case where the intake valve and the exhaust valve are in the closed-valve state.

For the sake of convenience of explanation, it will be assumed hereinafter that the first angle $\theta_1$ is an angle that can be assumed by the crank angle $\theta_c$ in the vicinity of the end of a compression stroke.

After that, the motor control unit 192 changes the target stop angle $\theta_{tgt}$ as necessary (step S3). The operation of changing the target stop angle $\theta_{tgt}$ in step S3 of FIG. 2 will be described hereinafter in detail with reference to FIG. 3.

Figure 3:
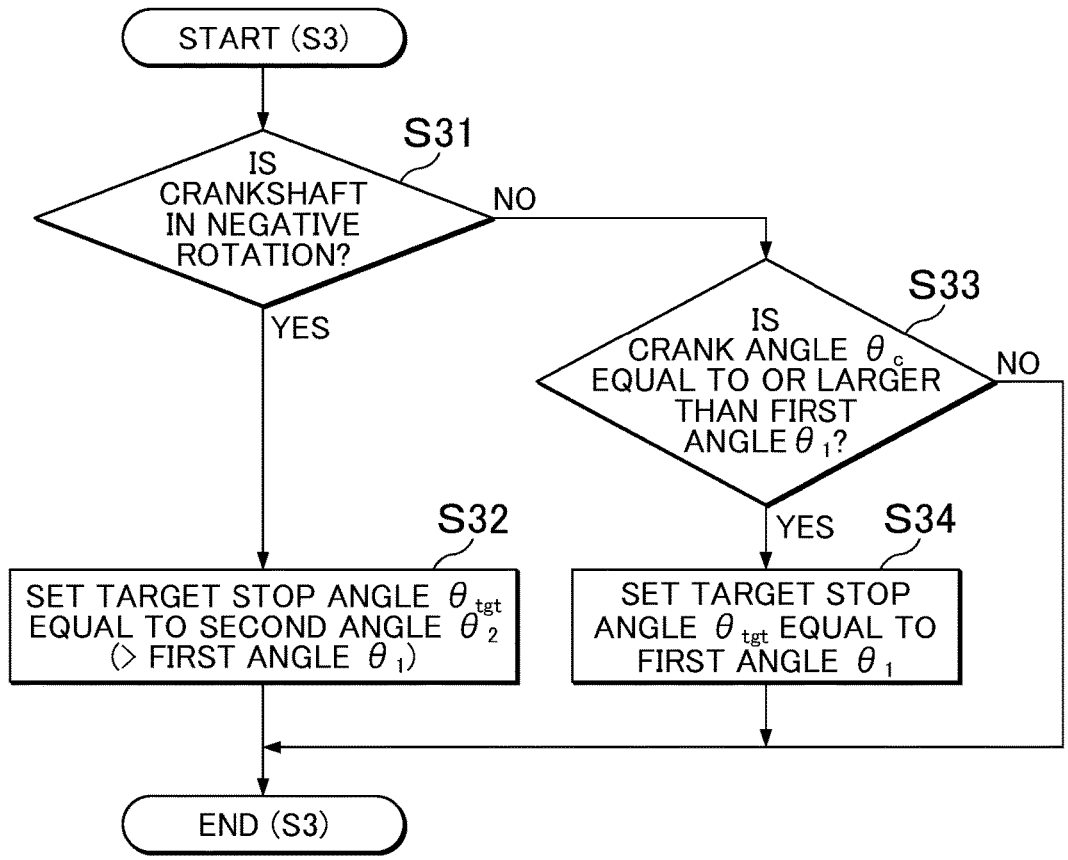
FIG. 3 is a flowchart showing the flow of an operation that is carried out in the first example of the crank stop operation to change a target stop angle.

As shown in FIG. 3, the rotation detection unit 191 determines whether or not the crankshaft rotates in a negative rotational direction, based on the crank angle $\theta_c$ that is output by the crank angle sensor 111 (step S31). When the time-derivative value of the crank angle $\theta_c$ is smaller than 0, the rotation detection unit 191 determines that the engine 11 rotates in the negative rotational direction. On the other hand, when the time-derivative value of the crank angle $\theta_c$ is larger than 0, the rotation detection unit 191 determines that the engine 11 does not rotate in the negative rotational direction (i.e., rotates in a positive rotational direction). Incidentally, "the positive rotational direction" in the present embodiment means a direction in which the crankshaft normally rotates when the engine 11 is driven (i.e., a direction in which the crank angle $\theta_c$ increases). "The negative rotational direction" in the present embodiment means the opposite rotational direction of the positive rotational direction (i.e., a direction in which the crank angle $\theta_c$ decreases).

When it is determined as a result of the determination in step S31 that the crankshaft rotates in the negative rotational direction (Yes in step S31), the motor control unit 192 sets a second angle $\theta_2$ as the target stop angle $\theta_{tgt}$ (step S32). The second angle $\theta_2$ is larger than the first angle $\theta_1$. That is, the second angle $\theta_2$ corresponds to an angle that is obtained by adding an offset amount in the positive rotational direction to the first angle $\theta_1$. The second angle $\theta_2$ may be a parameter that is stored in advance by the ECU 19, or a parameter that is calculated by the ECU 19 as appropriate. As is the case with the first angle $\theta_1$, the second angle $\theta_2$ preferably corresponds to the crank angle $\theta_c$ in the case where the intake valve and the exhaust valve that are installed in at least one of the cylinders are in the closed-valve state. It should be noted, however, that the second angle $\theta_2$ may be different from the crank angle $\theta_c$ in the case where the intake valve and the exhaust valve that are installed in at least one of the cylinders are in the closed-valve state.

On the other hand, when it is determined as a result of the determination in step S31 that the crankshaft does not rotate in the negative rotational direction (No in step S31), the engine 11 is assumed to rotate in the positive rotational direction. This is because when the engine 11 is stopped, the crank stop operation ends as a result of a determination in step S9 of FIG. 2 that will be described later, so the operation shown in FIG. 3 is not carried out. In this case, the motor control unit 192 determines whether or not the current crank angle $\theta_c$ is equal to or larger than the first angle $\theta_1$ (step S33). When it is determined as a result of the determination in step S33 that the current crank angle $\theta_c$ is equal to or larger than the first angle $\theta_1$ (Yes in step S33), the motor control unit 192 sets the first angle $\theta_1$ as the target stop angle $\theta_{tgt}$ (step S34). On the other hand, when it is determined as a result of the determination in step S33 that the current crank angle $\theta_c$ is smaller than the first angle $\theta_1$ (No in step S33), the motor control unit 192 does not change the target stop angle $\theta_{tgt}$. Therefore, in the case where the first angle $\theta_1$ is set as the target stop angle $\theta_{tgt}$, the target stop angle $\theta_{tgt}$ is held equal to the first angle $\theta_1$. In the case where the second angle $\theta_2$ is set as the target stop angle $\theta_{tgt}$, the target stop angle $\theta_{tgt}$ is held equal to the second angle $\theta_2$.

Referring to FIG. 2 again, the motor control unit 192 calculates a target moving amount $R_{tgt}$ by which the crankshaft should move (i.e., rotate) before the current crank angle $\theta_c$ becomes equal to the target stop angle $\theta_{tgt}$ (step S4). In concrete terms, the motor control unit 192 calculates a difference $\Delta\theta$ between the current crank angle $\theta_c$ and the target stop angle $\theta_{tgt}$. Furthermore, the motor control unit 192 calculates a total rotational speed $N_{total}$ of the crankshaft that is needed before the crankshaft is stopped (i.e., before the inertial force in the positive rotational direction of the crankshaft disappears). After that, the motor control unit 192 calculates the target moving amount $R_{tgt}$ through the use of a mathematical expression: the target moving amount $R_{tgt}$=the difference $\Delta\theta+360°\times N_{total}$.

Figure 4A:
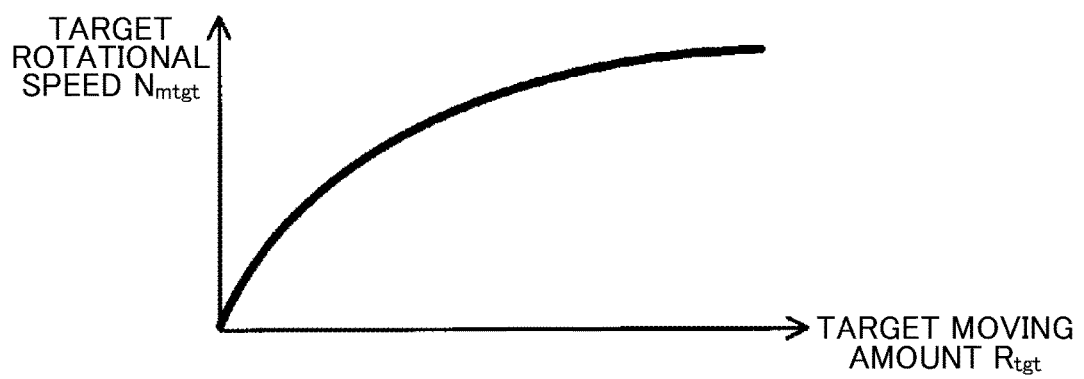
FIG. 4A is a first map prescribing a relationship between a target moving amount and a target rotational speed.
Figure 4B:
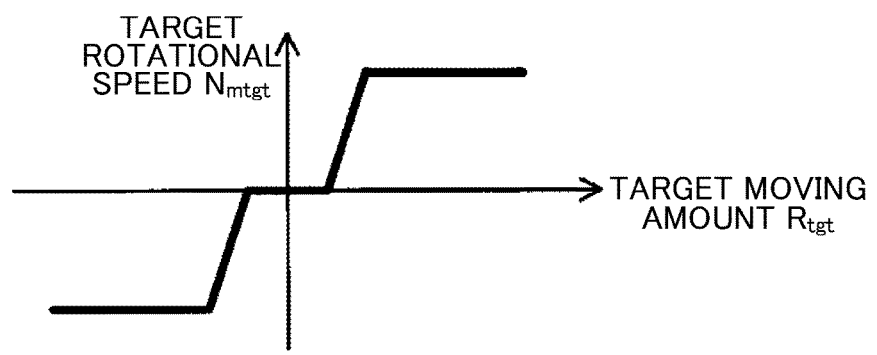
FIG. 4B is a second map prescribing a relationship between a target moving amount and a target rotational speed.

After that, the motor control unit 192 calculates a target value of the motor rotational speed $N_m$ (a target rotational speed $N_{mtgt}$) based on the target moving amount $R_{tgt}$ calculated in step S4 (step S5). The motor control unit 192 calculates the target rotational speed $N_{mtgt}$ based on a map that prescribes a relationship between the target moving amount $R_{tgt}$ and the target rotational speed $N_{mtgt}$. In particular, when the target moving amount $R_{tgt}$ is equal to or larger than 360° (i.e., the crankshaft rotates by 360° or more before stopping), the motor control unit 192 calculates the target rotational speed $N_{mtgt}$ based on a first map shown in FIG. 4A. The first map prescribes the target rotational speed $N_{mtgt}$ that falls as the target moving amount $R_{tgt}$ decreases. On the other hand, when the target moving amount $R_{tgt}$ is smaller than 360° (i.e., the crankshaft stops before rotating by 360°, namely, the crankshaft stops as soon as the crank angle $\theta_c$ subsequently becomes equal to the target stop angle $\theta_{tgt}$), the motor control unit 192 calculates the target rotational speed $N_{mtgt}$ based on a second map shown in FIG. 4B. The second map prescribes the positive target rotational speed $N_{mtgt}$ when the target moving amount $R_{tgt}$ is equal to or larger than a positive predetermined value, prescribes the negative target rotational speed $N_{mtgt}$ when the target moving amount $R_{tgt}$ is equal to or smaller than a negative predetermined value, and prescribes the target rotational speed $N_{mtgt}$ as zero when the target moving amount $R_{tgt}$ is smaller than the positive predetermined value and larger than the negative predetermined value.

After that, the motor control unit 192 calculates a difference $\Delta N_m$ between the current motor rotational speed $N_m$ and the target rotational speed $N_{mtgt}$ (step S6). After that, the motor control unit 192 calculates the torque command value $T_{tgt}$ based on the difference $\Delta N_m$ (step S7). That is, the motor control unit 192 calculates the torque command value $T_{tgt}$ by performing feedback control (e.g., PI control) for making the difference $\Delta N_m$ equal to zero. After that, the motor control unit 192 generates the switching control signal S corresponding to the torque command value $T_{tgt}$, and outputs the generated switching control signal S to the inverter 15 (step S8). As a result, the motor-generator 12 outputs the torque $T_m$ corresponding to the torque command value $T_{tgt}$.

After that, the motor control unit 192 determines whether or not the engine 11 is stopped (step S9). For example, when the time-derivative value of the crank angle $\theta_c$ remains equal to zero over a predetermined time, the motor control unit 192 may determine that the engine 11 is stopped. When it is determined as a result of the determination in step S9 that the engine 11 is not stopped (No in step S9), the ECU 19 carries out the operation from step S3 to step S8 again. On the other hand, when it is determined as a result of the determination in step S9 that the engine 11 is stopped (Yes in step S9), the ECU 19 ends the crank stop operation. In this case, the ECU 19 may start the crank stop operation shown in FIG. 2 again after the lapse of a second time.

Subsequently, a technical effect of the first example of the crank stop operation will be described with reference to timing charts shown in FIGS. 5 and 6. In the following, with a view to elucidating the technical effect of the first example of the crank stop operation, the technical effect of the first example of the crank stop operation will be described after describing a technical problem that can arise in a comparative example of the crank stop operation in which the target stop angle $\theta_{tgt}$ continues to be held equal to the first angle $\theta_1$.

Figure 5:
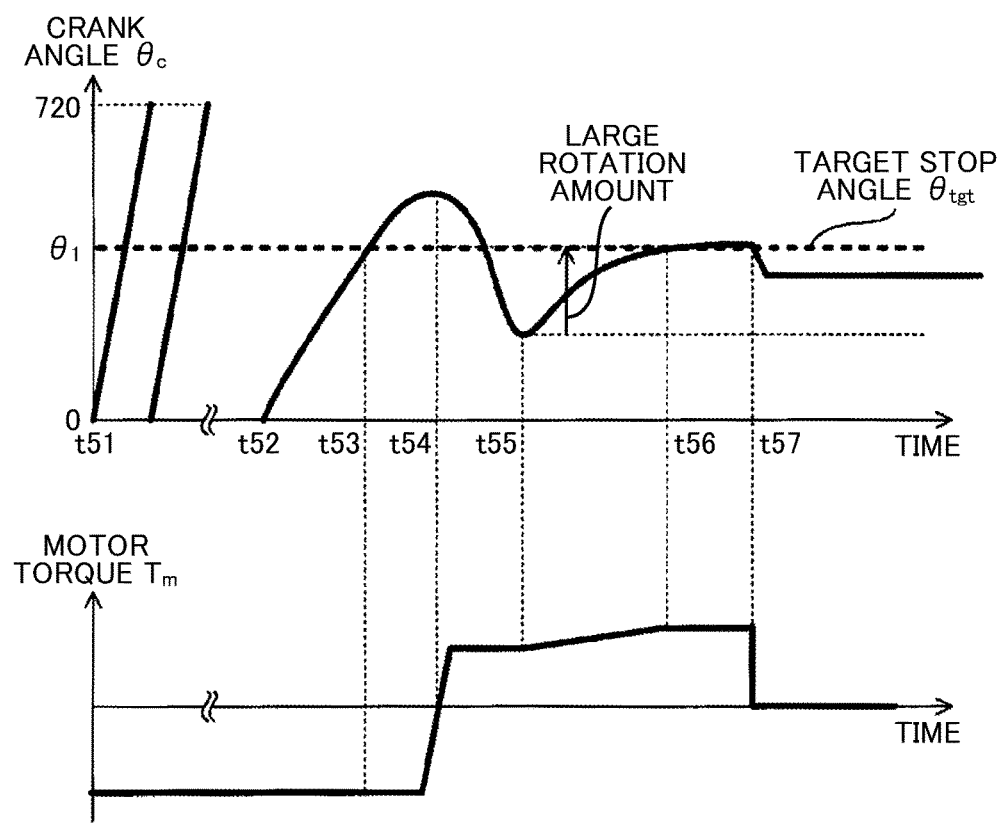
FIG. 5 is a timing chart showing the target stop angle, a crank angle and a torque in the case where a comparative example of the crank stop operation is carried out.

First of all, FIG. 5 is a timing chart showing the target stop angle $\theta_{tgt}$, the crank angle $\theta_c$ and the torque $T_m$ in the case where the comparative example of the crank stop operation is carried out. As shown in FIG. 5, the comparative example of the crank stop operation starts at a time point t51. In this case, although the engine 11 is stopped from being supplied with fuel, the crankshaft continues to rotate in the positive rotational direction due to an inertial force. That is, the crank angle $\theta_c$ repeatedly changes from 0° to 720°. Therefore, the motor control unit 192 controls the motor-generator 12 through the use of the first map. As a result, the motor-generator 12 outputs the torque $T_m$ that acts in the negative rotational direction, in such a manner as to counterbalance the inertial force in the positive rotational direction of the crankshaft.

After that, the inertial force in the positive rotational direction of the crankshaft gradually decreases. As a result, the target moving amount $R_{tgt}$ becomes smaller than 360° at a time point t52. That is, the target moving amount $R_{tgt}$ at the time point t52 indicates that the crankshaft should stop as soon as the crank angle $\theta_c$ subsequently becomes equal to the target stop angle $\theta_{tgt}$. Therefore, the motor control unit 192 controls the motor-generator 12 through the use of the second map. In this case as well, the motor-generator 12 outputs the torque $T_m$ that acts in the negative rotational direction, in such a manner as to counterbalance the inertial force in the positive rotational direction of the crankshaft and stop the crankshaft as soon as the crank angle $\theta_c$ subsequently becomes equal to the target stop angle $\theta_{tgt}$.

However, as described above, the torque command value $T_{tgt}$ that prescribes the torque $T_m$ is calculated through feedback control. Therefore, as a result of the responsiveness (e.g., a response delay or the like) of feedback control, the torque command value $T_{tgt}$ may not become equal to a value capable of stopping the crankshaft as soon as the crank angle $\theta_c$ becomes equal to the target stop angle $\theta_{tgt}$ (i.e., the difference $\Delta\theta$ becomes to zero). In this case, as shown in FIG. 5, even in the case where the crank angle $\theta_c$ becomes equal to the target stop angle $\theta_{tgt}$ at a time point t53, the inertial force in the positive rotational direction of the crankshaft remains. As a result, even when the crank angle $\theta_c$ becomes larger than the target stop angle $\theta_{tgt}$, the crankshaft rotates in the positive rotational direction. That is, an overshoot of the crank angle $\theta_c$ in the positive rotational direction with respect to the target stop angle $\theta_{tgt}$ occurs.

Even when the crank angle $\theta_c$ becomes larger than the target stop angle $\theta_{tgt}$, the motor-generator 12 outputs the torque $T_m$ that acts in the negative rotational direction, in such a manner as to counterbalance the inertial force in the positive rotational direction of the crankshaft. As a result, the inertial force in the positive rotational direction of the crankshaft becomes equal to zero at a time point t54.

It should be noted herein that the first angle $\theta_1$ is an angle that can be assumed by the crank angle $\theta_c$ in the vicinity of the end of a compression stroke as described above. Furthermore, the first angle $\theta_1$ corresponds to the crank angle $\theta_c$ in the case where the intake valve and the exhaust valve are in the closed-valve state. Accordingly, immediately before the time point t54, the crankshaft rotates such that the piston compresses the air in a combustion chamber. Therefore, at the time point t54, a force that acts in such a manner as to push down the piston (i.e., rotate the crankshaft in the negative rotational direction) is applied from the air in the combustion chamber to the piston. Furthermore, the inertial force in the positive rotational direction of the crankshaft is equal to zero at the time point t54. Therefore, at and after the time point t54, the crankshaft rotates in the negative rotational direction due to the force that is applied to the piston from the air in the combustion chamber.

At and after the time point t54, the crankshaft rotates in the negative rotational direction due to the force (so-called reaction) of the air in the combustion chamber. Therefore, the motor-generator 12 outputs the torque $T_m$ that acts in the positive rotational direction, such that the crankshaft stops as soon as the crank angle $\theta_c$ becomes equal to the target stop angle $\theta_{tgt}$ through adjustment of the rotation amount of the crankshaft in the negative rotational direction. Therefore, when the crank angle $\theta_c$ is in the vicinity of the target stop angle $\theta_{tgt}$ (i.e., the absolute value of the difference $\Delta\theta$ is equal to or smaller than a predetermined value), the motor-generator 12 is controlled in consideration of the behavior of the crankshaft corresponding to the force of the air in the combustion chamber as well as the second map (the same holds true for the first example of the crank stop operation as well as the completive example). On the other hand, the torque command value $T_{tgt}$ that prescribes the torque $T_m$ that acts in the positive rotational direction is also calculated through feedback control. Therefore, as shown in FIG. 5, even in the case where the crank angle $\theta_c$ becomes equal to the target stop angle $\theta_{tgt}$ at or after the time point t54, the crankshaft may rotate in the negative rotational direction. That is, an overshoot of the crank angle $\theta_c$ in the negative rotational direction with respect to the target stop angle $\theta_{tgt}$ occurs.

Even when the crank angle $\theta_c$ becomes smaller than the target stop angle $\theta_{tgt}$, the motor-generator 12 outputs the torque $T_m$ that acts in the positive rotational direction, in such a manner as to adjust the rotation amount of the crankshaft in the negative rotational direction. As a result, the rotational direction of the crankshaft changes over from the negative rotational direction to the positive rotational direction at a time point t55. At the time point t55, the crank angle $\theta_c$ is smaller than the target stop angle $\theta_{tgt}$. Therefore, the motor-generator 12 continues to output the torque $T_m$ that acts in the positive rotational direction, such that the crankshaft stops with the crank angle $\theta_c$ equal to the target stop angle $\theta_{tgt}$. As a result, the crank angle $\theta_c$ becomes equal to the target stop angle $\theta_{tgt}$ at a time point t56.

However, the force that is applied to the piston from the air in the combustion chamber in such a manner as to push down the crankshaft is larger in the case where the rotation amount of the crankshaft in the positive rotational direction during a period from the time point t55 to the time point t56 (i.e., the rotation amount of the crankshaft immediately before the stop of the crankshaft) is relatively large than in the case where the rotation amount of the crankshaft in the positive rotational direction during the period from the time point t55 to the time point t56 is relatively small. Therefore, at and after the time point t56 as well, the motor-generator 12 needs to continue to output the relatively large torque $T_m$ that acts in the positive rotational direction, such that the crankshaft does not rotate as a result of a force that is received by the piston from the air in the combustion chamber. When the motor-generator 12 stops outputting the torque $T_m$ at a time point t57, the crankshaft rotates in the negative rotational direction as a result of the force that is received by the piston from the air in the combustion chamber. Accordingly, it is difficult for the crankshaft to stop with the crank angle $\theta_c$ equal to the target stop angle $\theta_{tgt}$.

In view of this technical problem that arises in the comparative example of the crank stop operation, according to the first example of the crank stop operation, the target stop angle $\theta_{tgt}$ is changed from the first angle $\theta_1$ to the second angle $\theta_2$, with a view to making the rotation amount of the crankshaft in the negative rotational direction relatively small and making the amount of subsequent rotation of the crankshaft in the positive rotational direction relatively small.

Figure 6:
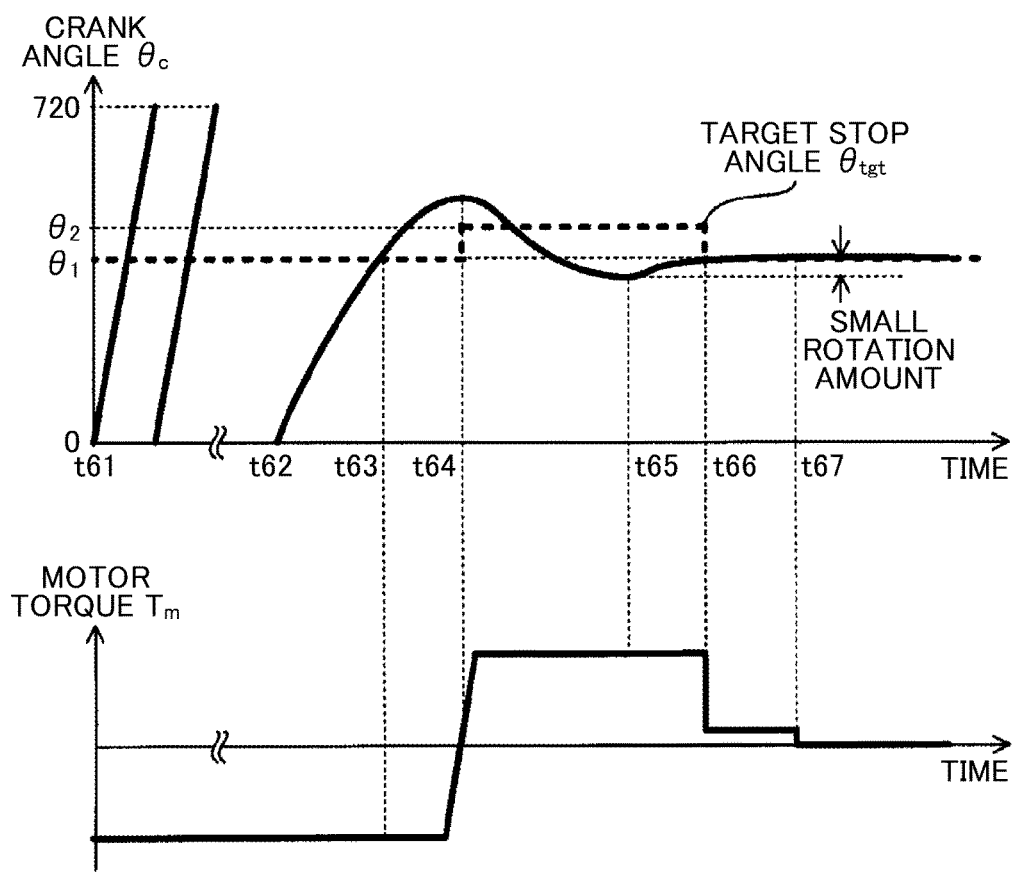
FIG. 6 is a timing chart showing the target stop angle, the crank angle and the torque in the case where the first example of the crank stop operation is carried out.

In concrete terms, FIG. 6 is a timing chart showing the target stop angle $\theta_{tgt}$, the crank angle $\theta_c$ and the torque $T_m$ in the case where the first example of the crank stop operation is carried out. As shown in FIG. 6, the first example of the crank stop operation starts at a time point t61. In this case as well as the case where the comparative example of the crank stop operation is carried out, the motor-generator 12 outputs the torque $T_m$ that acts in the negative rotational direction, in such a manner as to counterbalance the inertial force in the positive rotational direction of the crankshaft. After that, the target moving amount $R_{tgt}$ becomes smaller than 360° at a time point t62. After that, an overshoot of the crank angle $\theta_c$ in the positive rotational direction with respect to the target stop angle $\theta_{tgt}$ occurs at a time point t63, as a result of the responsiveness of feedback control. After that, the inertial force in the positive rotational direction of the crankshaft becomes equal to zero at a time point t64.

From the time point t61 to the time point t64, the engine 11 continues to rotate in the positive rotational direction, so the target stop angle $\theta_{tgt}$ is not set to the second angle $\theta_2$. Therefore, the target stop angle $\theta_{tgt}$ is held equal to the first angle $\theta_1$, regardless of whether the crank angle $\theta_c$ is equal to or larger than the first angle $\theta_1$. On the other hand, at and after the time point t64, the crankshaft rotates in the negative rotational direction. As a result, the target stop angle $\theta_{tgt}$ is changed from the first angle $\theta_1$ to the second angle $\theta_2$ at the time point t64.

At and after the time point t64, as is the case with the comparative example, the motor-generator 12 outputs the torque $T_m$ that acts in the positive rotational direction. Furthermore, the rotational direction of the crankshaft changes over from the negative rotational direction to the positive rotational direction at a time point t65. Besides, it is assumed that an overshoot of the crank angle $\theta_c$ in the negative rotational direction with respect to the pre-change target stop angle $\theta_{tgt}$ (i.e., the first angle $\theta_1$) has occurred at the time point t65. On the contrary, in the case where an overshoot of the crank angle $\theta_c$ in the negative rotational direction with respect to the pre-change target stop angle $\theta_{tgt}$ (i.e., the first angle $\theta_1$) does not occur after the crankshaft rotates in the negative rotational direction, an operation different from the crank stop operation shown in FIG. 2 may be carried out. Even in the case where the rotational direction of the crankshaft changes over to the positive rotational direction at the time point t65, the crank angle $\theta_c$ is smaller than the first angle $\theta_1$, so the target stop angle $\theta_{tgt}$ is held equal to the second angle $\theta_2$. Furthermore, at and after the time point t65 as well, the motor-generator 12 continues to output the torque $T_m$ that acts in the positive rotational direction, such that the crankshaft stops with the crank angle $\theta_c$ equal to the target stop angle $\theta_{tgt}$. After that, the crank angle $\theta_c$ coincides with the first angle $\theta_1$ at a time point t66. As a result, it is determined that the crank angle $\theta_c$ becomes equal to or larger than the first angle $\theta_1$, so the target stop angle $\theta_{tgt}$ is changed from the second angle $\theta_2$ to the first angle $\theta_1$. As a result, the crankshaft stops with the crank angle $\theta_c$ equal to the first angle $\theta_1$ as the target stop angle $\theta_{tgt}$.

It should be noted herein that the rotation amount of the crankshaft in the negative rotational direction that is needed to make the crank angle $\theta_c$ coincident with the target stop angle $\theta_{tgt}$ is smaller in the case where the target stop angle $\theta_{tgt}$ is set to the second angle $\theta_2$ than in the case where the target stop angle $\theta_{tgt}$ is held equal to the first angle $\theta_1$. Therefore, the rotation amount of the crankshaft in the negative rotational direction at and after the time point t64 is made smaller in the case where the target stop angle $\theta_{tgt}$ is set to the second angle $\theta_2$ than in the case where the target stop angle $\theta_{tgt}$ is held equal to the first angle $\theta_1$, so the torque $T_m$ that is output at and after the time point t64 and that acts in the positive rotational direction is relatively large. As a result, the rotation amount of the crankshaft in the negative rotational direction at and after the time point t64 is small, so the rotation amount of the crankshaft in the positive rotational direction at and after the time point t65 is also small. Accordingly, at the time point t66, the force that is applied to the piston from the air in the combustion chamber in such a manner as to push down the crankshaft is also small. Therefore, at and after the time point t66, even when the motor-generator 12 does not continue to output the relatively large torque $T_m$ that acts in the positive rotational direction, the crankshaft does not rotate as a result of a force that is received by the piston from the air in the combustion chamber. Therefore, even if the motor-generator 12 stops outputting the torque $T_m$ at a time point t67, the crankshaft does not rotate in the negative rotational direction as a result of a force that is received by the piston from the air in the combustion chamber. Accordingly, the crankshaft can appropriately stop with the crank angle $\theta_c$ equal to the target stop angle $\theta_{tgt}$. That is, according to the first example of the crank stop operation, even in the case where the crankshaft rotates in the negative rotational direction as a result of the responsiveness of feedback control before stopping, the crankshaft can stop with the crank angle $\theta_c$ equal to the target stop angle $\theta_{tgt}$.

The rotation amount of the crankshaft in the negative rotational direction resulting from the responsiveness of the above-mentioned feedback control tends to increase as the number of cylinders with which the engine 11 is equipped decreases. This is because the possibility of rotation of the crankshaft in the negative rotational direction due to the air compressed in a certain cylinder being counterbalanced by the behavior of the crankshaft in the other cylinder(s) decreases as the number of cylinders decreases. Therefore, the technical effect according to the first example of the crank stop operation is more remarkable in the case where the number of cylinders of the engine 11 is equal to or smaller than a predetermined number than in the case where the number of cylinders of the engine 11 is larger than the predetermined number. For example, the technical effect according to the first example of the crank stop operation is more remarkable in the case where the number of cylinders is equal to or smaller than 4 (or equal to or smaller than 6) than in the case where the number of cylinders is larger than 4 (or larger than 6). Incidentally, in the case where the engine 11 is equipped with a plurality of cylinders, the ECU 19 may carry out the first example of the above-mentioned crank stop operation as to at least one of the plurality of the cylinders. In this case, at least one of the cylinders that is subjected to the first example of the crank stop operation is preferably a cylinder in which the target stop angle $\theta_{tgt}$ is set to the first angle $\theta_1$ corresponds to the crank angle $\theta_c$ in the case where the intake valve and the exhaust valve are in the closed-valve state.

Incidentally, as described above, the second angle $\theta_2$ is the target stop angle $\theta_{tgt}$ that is set for the purpose of making the rotation amount of the crankshaft in the negative rotational direction small. In other words, the second angle $\theta_2$ is the target stop angle $\theta_{tgt}$ that is set for the purpose of making large the torque $T_m$ that is output under the circumstances where the crankshaft rotates in the negative rotational direction and that acts in the positive rotational direction. Accordingly, the second angle $\theta_2$ is preferably set to an appropriate value in advance based on the specification of the vehicle 1 or the like, from the standpoint of achieving this purpose.

Figure 7:
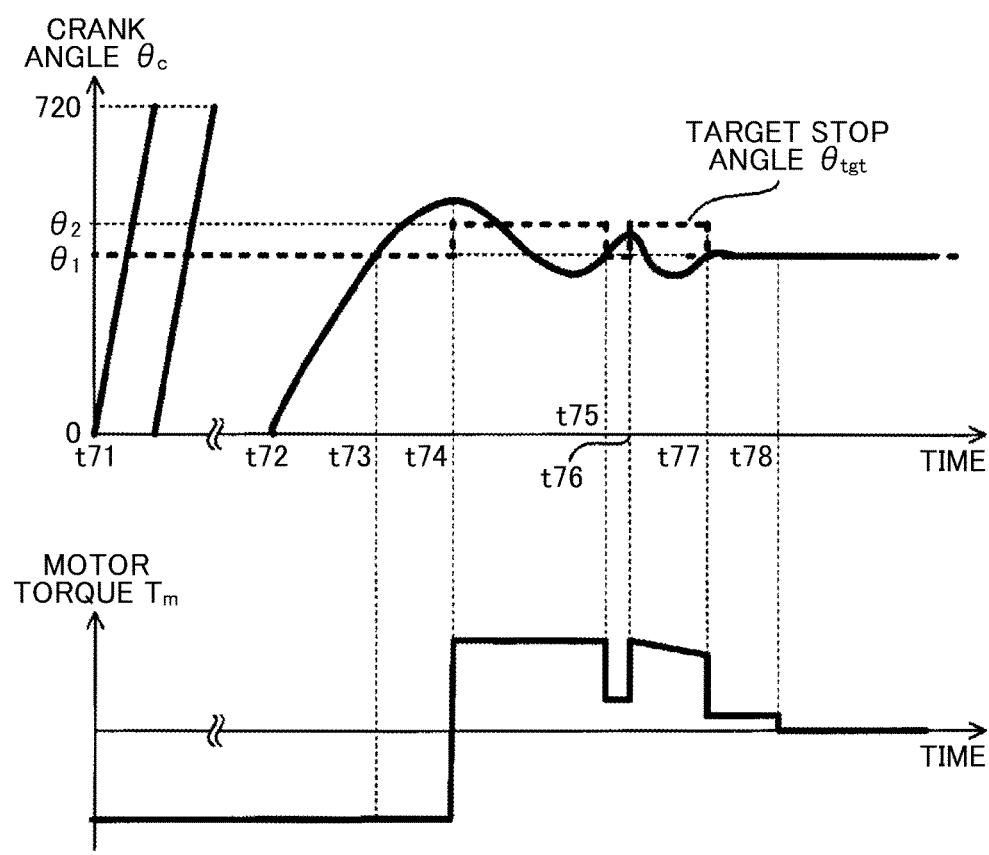
FIG. 7 is a timing chart showing the target stop angle, the crank angle and the torque in the case where a crankshaft repeats a cycle of rotation, which consists of rotation in a negative rotational direction and rotation in a positive rotational direction, twice under the circumstances where the first example of the crank stop operation is carried out.

In the foregoing description, rotation of the crankshaft in the negative rotational direction resulting from the responsiveness of feedback control occurs only once. However, rotation of the crankshaft in the negative rotational direction resulting from the responsiveness of feedback control may occur twice or more. That is, the crankshaft may repeat a cycle of rotation consisting of rotation in the negative rotational direction and rotation in the positive rotational direction a plurality of times, as a result of the responsiveness of feedback control. In this case as well, the crankshaft can be stopped with the crank angle $\theta_c$ equal to the target stop angle $\theta_{tgt}$, by carrying out the first example of the above-mentioned crank stop operation. For example, FIG. 7 is a timing chart showing the target stop angle $\theta_{tgt}$, the crank angle $\theta_c$ and the torque $T_m$ in the case where the crankshaft repeats a cycle of rotation consisting of rotation in the negative rotational direction and rotation in the positive rotational direction twice under the circumstances where the first example of the crank stop operation is carried out. As shown in FIG. 7, the first example of the crank stop operation starts at a time point t71, the target moving amount $R_{tgt}$ becomes smaller than 360° at a time point t72, an overshoot of the crank angle $\theta_c$ in the positive rotational direction with respect to the target stop angle $\theta_{tgt}$ occurs at a time point t73, and the rotational direction of the crankshaft changes over from the positive rotational direction to the negative rotational direction at a time point t74. As a result, the target stop angle $\theta_{tgt}$ is changed from the first angle $\theta_1$ to the second angle $\theta_2$ at the time point t74. After that, the crankshaft carries out a cycle of rotation consisting of rotation in the negative rotational direction and rotation in the positive rotational direction once. As a result, the crank angle $\theta_c$ coincides with the first angle $\theta_1$ at a time point t75, and the target stop angle $\theta_{tgt}$ is changed from the second angle $\theta_2$ to the first angle $\theta_1$. However, at and after the time point t75 as well, an overshoot of the crank angle $\theta_c$ in the positive rotational direction with respect to the target stop angle $\theta_{tgt}$ may occur as a result of the responsiveness of feedback control. As a result, the crankshaft restarts rotation in the negative rotational direction at a time point t76. As a result, the target stop angle $\theta_{tgt}$ is changed again from the first angle $\theta_1$ to the second angle $\theta_2$ at the time point t76. After that, the crankshaft carries out a cycle of rotation consisting of rotation in the negative rotational direction and rotation in the positive rotational direction once. As a result, the crank angle $\theta_c$ coincides with the first angle $\theta_1$ at a time point t77, and the target stop angle $\theta_{tgt}$ is changed again from the second angle $\theta_2$ to the first angle $\theta_1$. As a result, the crankshaft stops with the crank angle $\theta_c$ equal to the first angle $\theta_1$ as the target stop angle $\theta_{tgt}$.

In the foregoing description, the motor control unit 192 returns the target stop angle $\theta_{tgt}$ to the first angle $\theta_1$ at a timing when the crank angle $\theta_c$ becomes equal to or larger than the pre-change target stop angle $\theta_{tgt}$ (i.e., the first angle $\theta_1$) after the rotational direction of the crankshaft changes over from the negative rotational direction to the positive rotational direction. However, the motor control unit 192 may return the target stop angle $\theta_{tgt}$ to the first angle $\theta_1$ at a timing when a predetermined period elapses after the rotational direction of the crankshaft changes over from the negative rotational direction to the positive rotational direction. In this case, even when an overshoot of the crank angle $\theta_c$ in the negative rotational direction with respect to the pre-change target stop angle $\theta_{tgt}$ (i.e., the first angle $\theta_1$) has not occurred upon a changeover in the rotational direction of the crankshaft from the negative rotational direction to the positive rotational direction, the crankshaft stops with the crank angle $\theta_c$ equal to the first angle $\theta_1$ as the original target stop angle $\theta_{tgt}$.

In the foregoing description, the first angle $\theta_1$ is an angle that can be assumed by the crank angle $\theta_c$ in the vicinity of the end of a compression stroke. Therefore, immediately before starting to rotate in the negative rotational direction, the crankshaft rotates such that the piston compresses the air in the combustion chamber. However, immediately before starting to rotate in the negative rotational direction, the crankshaft may rotate such that the piston expands the air in the combustion chamber. In this case as well, the force that acts in such a manner as to pull up the piston (i.e., rotate the crankshaft in the negative rotational direction) (i.e., the force that is substantially corresponds to a negative pressure) is applied without fail to the piston from the air in the combustion chamber. Accordingly, the first example of the above-mentioned crank stop operation may be carried out not only in the case where immediately before starting to rotate in the negative rotational direction, the crankshaft rotates such that the piston compresses the air in the combustion chamber, but also in the case where immediately before starting to rotate in the negative rotational direction, the crankshaft rotates such that the piston expands the air in the combustion chamber. In this case as well, the above-mentioned effect is appropriately received.

The second example of the crank stop operation is different from the first example of the above-mentioned crank stop operation in that the gradually changing (i.e., gradually increasing/decreasing) second angle $\theta_2$ is used. In the first example of the crank stop operation, the fixed (i.e., unchanging) second angle $\theta_2$ is used. The second example of the crank stop operation is identical in other operational details to the first example of the crank stop operation. The gradually changing second angle $\theta_2$ is set by the operation of changing the target stop angle $\theta_{tgt}$ in step S3 of FIG. 2. Therefore, the flow of the second example of the crank stop operation will be described hereinafter with reference to the flowchart of FIG. 8.

Figure 8:
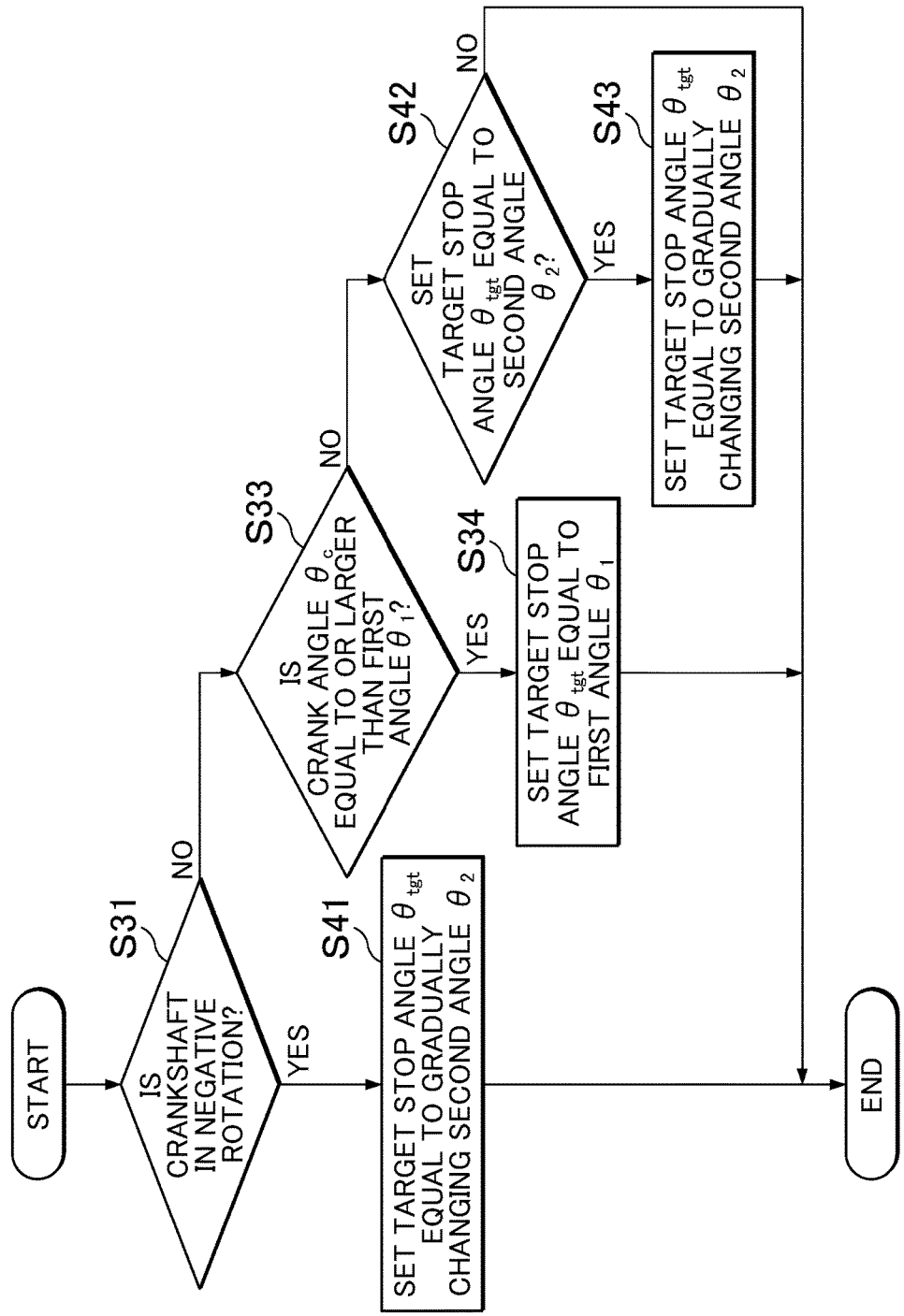
FIG. 8 is a flowchart showing the flow of an operation that is carried out in a second example of the crank stop operation to change the target stop angle.

As shown in FIG. 8, the rotation detection unit 191 determines whether or not the crankshaft rotates in the negative rotational direction (step S31). If it is determined as a result of the determination in step S31 that the crankshaft rotates in the negative rotational direction (Yes in step S31), the motor control unit 192 sets the gradually changing second angle $\theta_2$ as the target stop angle $\theta_{tgt}$ (step S41).

On the other hand, if it is determined as a result of the determination in step S31 that the crankshaft does not rotate in the negative rotational direction (No in step S31), the motor control unit 192 determines whether or not the current crank angle $\theta_c$ is equal to or larger than the first angle $\theta_1$ (step S33). If it is determined as a result of the determination in step S33 that the current crank angle $\theta_c$ is equal to or larger than the first angle $\theta_1$ (Yes in step S33), the motor control unit 192 sets the first angle $\theta_1$ as the target stop angle $\theta_{tgt}$ (step S34).

On the other hand, if it is determined as a result of the determination in step S33 that the current crank angle $\theta_c$ is smaller than the first angle $\theta_1$ (No in step S33), the motor control unit 192 determines whether or not the second angle $\theta_2$ is set as the target stop angle $\theta_{tgt}$ (step S42). If it is determined as a result of the determination in step S42 that the second angle $\theta_2$ is not set as the target stop angle $\theta_{tgt}$ (No in step S42), the target stop angle $\theta_{tgt}$ is held equal to the first angle $\theta_1$. If it is determined as a result of the determination in step S42 that the second angle $\theta_2$ is set as the target stop angle $\theta_{tgt}$ (Yes in step S42), the motor control unit 192 sets the gradually changing second angle $\theta_2$ as the target stop angle $\theta_{tgt}$ (step S43).

Figure 9:
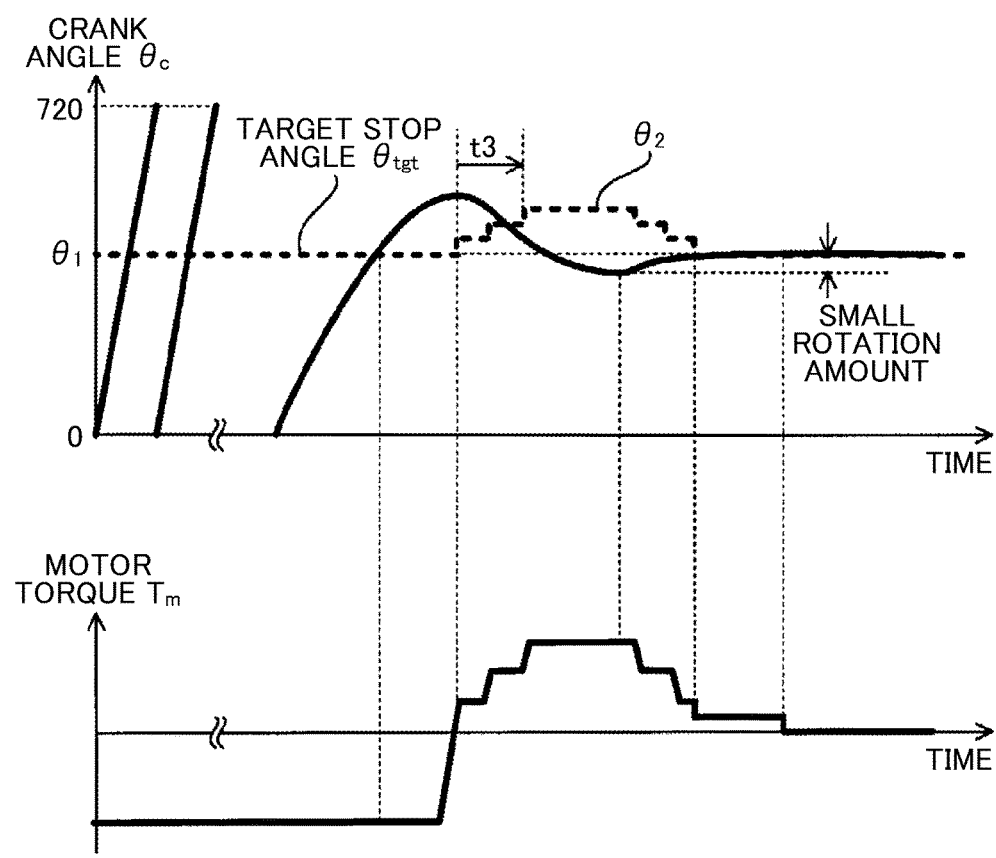
FIG. 9 is a timing chart showing the target stop angle, the crank angle and the torque in the case where the second example of the crank stop operation is carried out.

In order to set the gradually changing second angle $\theta_2$ in steps S41 and S43, the motor control unit 192 sets the second angle $\theta_2$ whose difference from the previous target stop angle $\theta_{tgt}$ is equal to or smaller than a predetermined amount. The operation shown in FIG. 8 is repeatedly carried out until the engine 11 stops. Therefore, the operations of steps S41 and S43 are also repeatedly carried out. As a result, as shown in FIG. 9, the second angle $\theta_2$ that is set as the target stop angle $\theta_{tgt}$ (i.e., the target stop angle $\theta_{tgt}$ itself) gradually changes. As a result, the torque $T_m$ changes more gently (in other words, is less likely to change rapidly) in the second example of the crank stop operation than in the first example of the crank stop operation.

As shown in FIG. 9, the motor control unit 192 can set the gradually increasing second angle $\theta_2$ as the target stop angle $\theta_{tgt}$. In this case, the motor control unit 192 may set the gradually changing second angle $\theta_2$ such that the second angle $\theta_2$ becomes equal to a peak value (specifically, corresponds to the second angle $\theta_2$ used in the first example) upon or before the lapse of a third time t3 after changing the target stop angle $\theta_{tgt}$ from the first angle $\theta_1$ to the second angle $\theta_2$. Besides, in setting the gradually increasing second angle $\theta_2$, the motor control unit 192 can set the second angle $\theta_2$ that gradually increases from the first angle $\theta_1$.

As shown in FIG. 9, the motor control unit 192 can set the gradually decreasing second angle $\theta_2$ as the target stop angle $\theta_{tgt}$. For example, the motor control unit 192 may monitor a difference between the current crank angle $\theta_c$ and the first angle $\theta_1$, predict, based on a result of the monitoring, a timing when the crank angle $\theta_c$ becomes equal to or larger than the first angle $\theta_1$ (i.e., a timing when the target stop angle $\theta_{tgt}$ is returned to the first angle $\theta_1$), and gradually reduce the second angle $\theta_2$ such that the target stop angle $\theta_{tgt}$ becomes equal to the first angle $\theta_1$ at the predicted timing. Besides, in setting the gradually decreasing second angle $\theta_2$, the motor control unit 192 can set the second angle $\theta_2$ that gradually decreases toward the first angle $\theta_1$.

Figure 10:
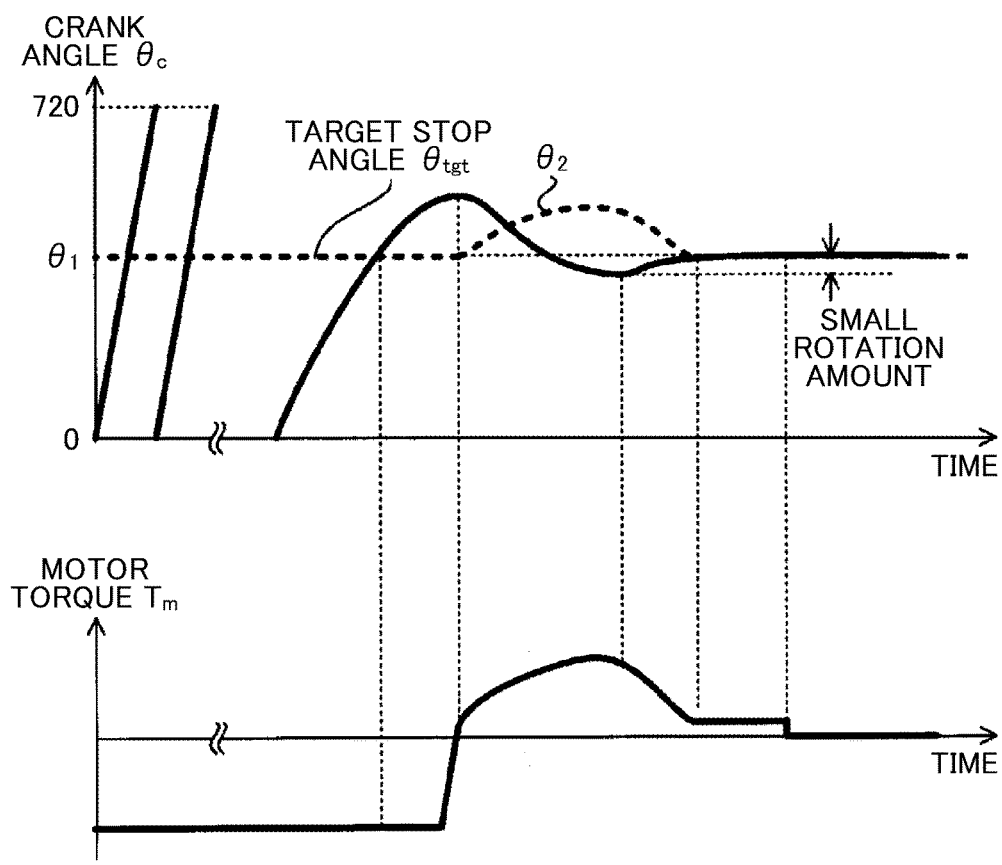
FIG. 10 is a timing chart showing the target stop angle, the crank angle and the torque in the case where the second example of the crank stop operation is carried out.

Incidentally, the amount of each change in the second angle $\theta_2$ decreases as the cycle on which the operation shown in FIG. 8 is repeatedly carried out shortens, so the second angle $\theta_2$ more smoothly changes. For example, FIG. 9 shows the target stop angle $\theta_{tgt}$, the crank angle $\theta_c$ and the torque $T_m$ in the case where the cycle on which the operation shown in FIG. 8 is repeatedly carried out is relatively long. On the other hand, for example, FIG. 10 shows the target stop angle $\theta_{tgt}$, the crank angle $\theta_c$ and the torque $T_m$ in the case where the cycle on which the operation shown in FIG. 8 is repeatedly carried out is relatively short.

Figure 11:
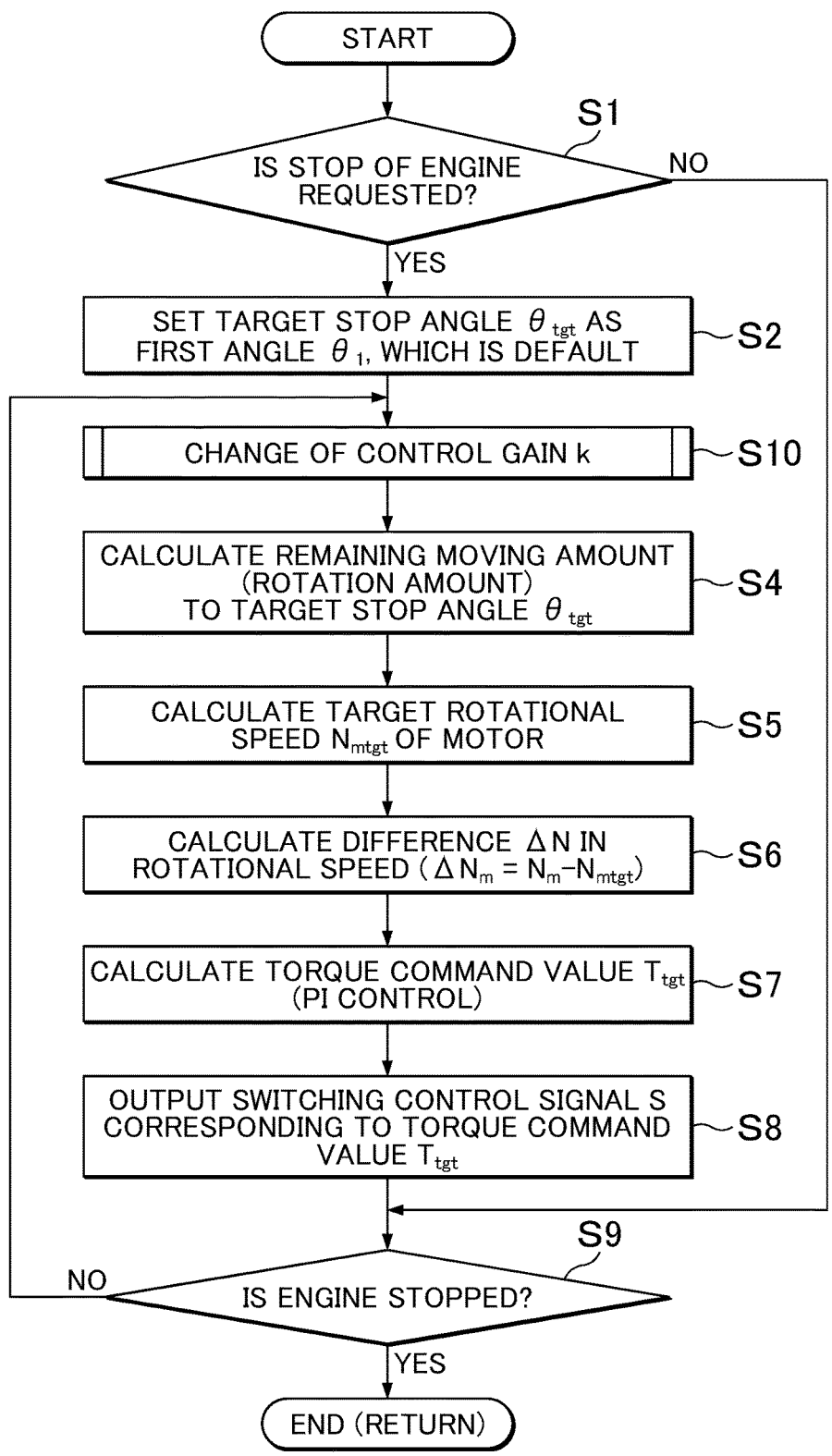
FIG. 11 is a flowchart showing the flow of a third example of the crank stop operation.

As shown in the flowchart of FIG. 11, the third example of the crank stop operation is different from the first example of the crank stop operation in that a control gain k capable of prescribing the magnitude of the torque $T_m$ is changed (step S10) with a view to making large the torque $T_m$ that is output under the circumstances where the crankshaft rotates in the negative rotational direction. The third example of the crank stop operation is different from the first example of the crank stop operation in that the first angle $\theta_1$ is used as the target stop angle $\theta_{tgt}$ (i.e., the second angle $\theta_2$ is not used). The third example of the crank stop operation is identical in other operational details to the first example of the crank stop operation. The operation of changing the control gain k in step S10 of FIG. 11 will be described hereinafter in detail with reference to the flowchart of FIG. 12.

Figure 12:
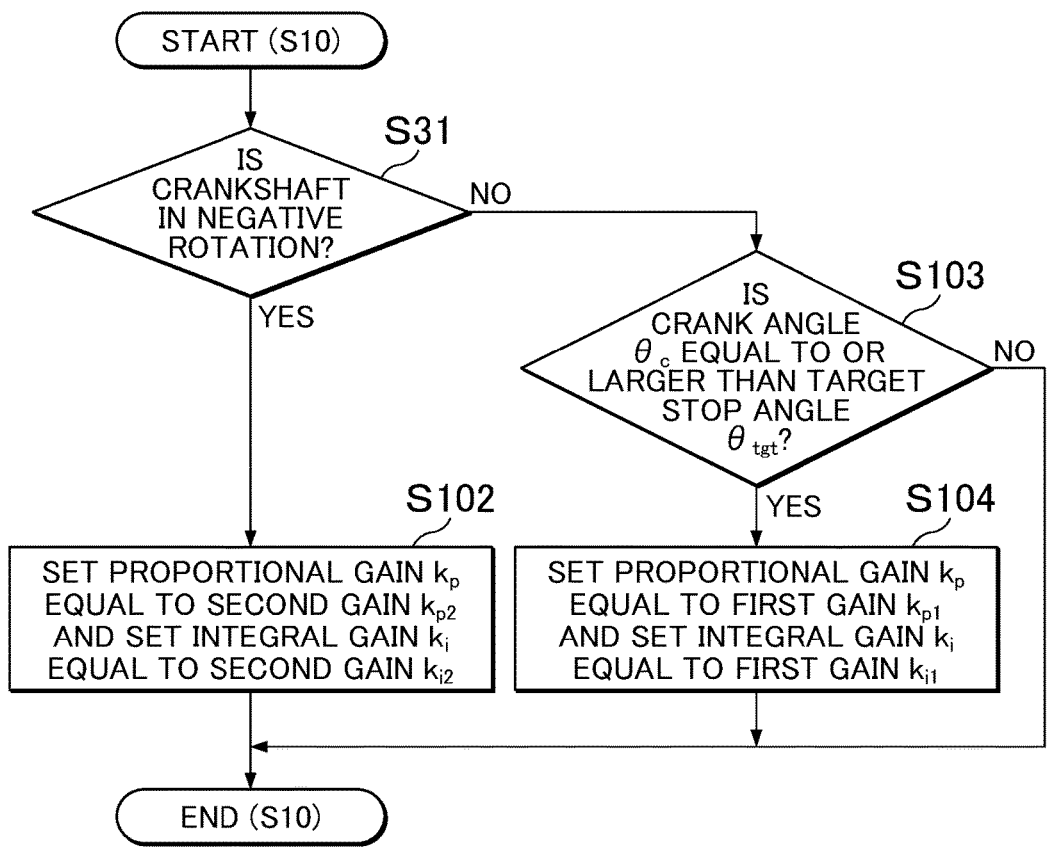
FIG. 12 is a flowchart showing the flow of a gain change operation that is carried out in the third example of the crank stop operation.

As shown in FIG. 12, the rotation detection unit 191 determines whether or not the crankshaft rotates in the negative rotational direction (step S31).

If it is determined as a result of the determination in step S31 that the crankshaft rotates in the negative rotational direction (Yes in step S31), the motor control unit 192 sets a second gain $k_2$ as the control gain k (step S102). In the present embodiment, the control gain k includes at least one of a proportional gain $k_p$ and an integral gain $k_i$ that are used in feedback control (PI control) performed by the above-mentioned motor control unit 192. Therefore, the motor control unit 192 sets a second gain $k_{p2}$ as the proportional gain $k_p$ and/or sets a second gain $k_{i2}$ as the integral gain $k_i$. The second gain $k_{p2}$ is the proportional gain $k_p$ capable of prescribing the torque $T_m$ that is larger than the torque $T_m$ (especially the torque that acts in the positive rotational direction, the same will hold true) $T_m$ prescribed by a first gain $k_{p1}$ that will be described later. The second gain $k_{i2}$ is the integral gain $k_i$ capable of prescribing the torque $T_m$ that is larger than the torque $T_m$ prescribed by a first gain $k_{i1}$ that will be described later. The second gains $k_{p2}$ and $k_{i2}$ may be parameters that are stored in advance by the ECU 19, or may be parameters that are calculated by the ECU 19 as appropriate. It should be noted, however, that the control gain k may be an arbitrary gain capable of adjusting the magnitude of the torque $T_m$.

On the other hand, if it is determined as a result of the determination in step S31 that the crankshaft does not rotate in the negative rotational direction (No in step S31), the motor control unit 192 determines whether or not the current crank angle $\theta_c$ is equal to or larger than the target stop angle $\theta_{tgt}$ (step S103).

If it is determined as a result of the determination in step S103 that the current crank angle $\theta_c$ is equal to or larger than the target stop angle $\theta_{tgt}$ (Yes in step S103), the motor control unit 192 sets the first gain $k_1$ as the control gain k (step S104). That is, the motor control unit 192 sets the first gain $k_{p1}$ as the proportional gain $k_p$ and/or sets the first gain $k_{i1}$ as the integral gain The first gain $k_i$. The first gain $k_1$ (i.e., the first gain $k_{p1}$ and the first gain $k_{i1}$) is a parameter that is stored in advance by the ECU 19 as the default control gain k. On the other hand, if it is determined as a result of the determination in step S103 that the current crank angle $\theta_c$ is smaller than the target stop angle $\theta_{tgt}$ (No in step S103), the motor control unit 192 does not change the control gain k. Therefore, when the first gain $k_1$ is set as the control gain k, the control gain k is held equal to the first gain $k_1$. When the second gain $k_2$ is set as the control gain k, the control gain k is held equal to the second gain $k_2$.

Figure 13:
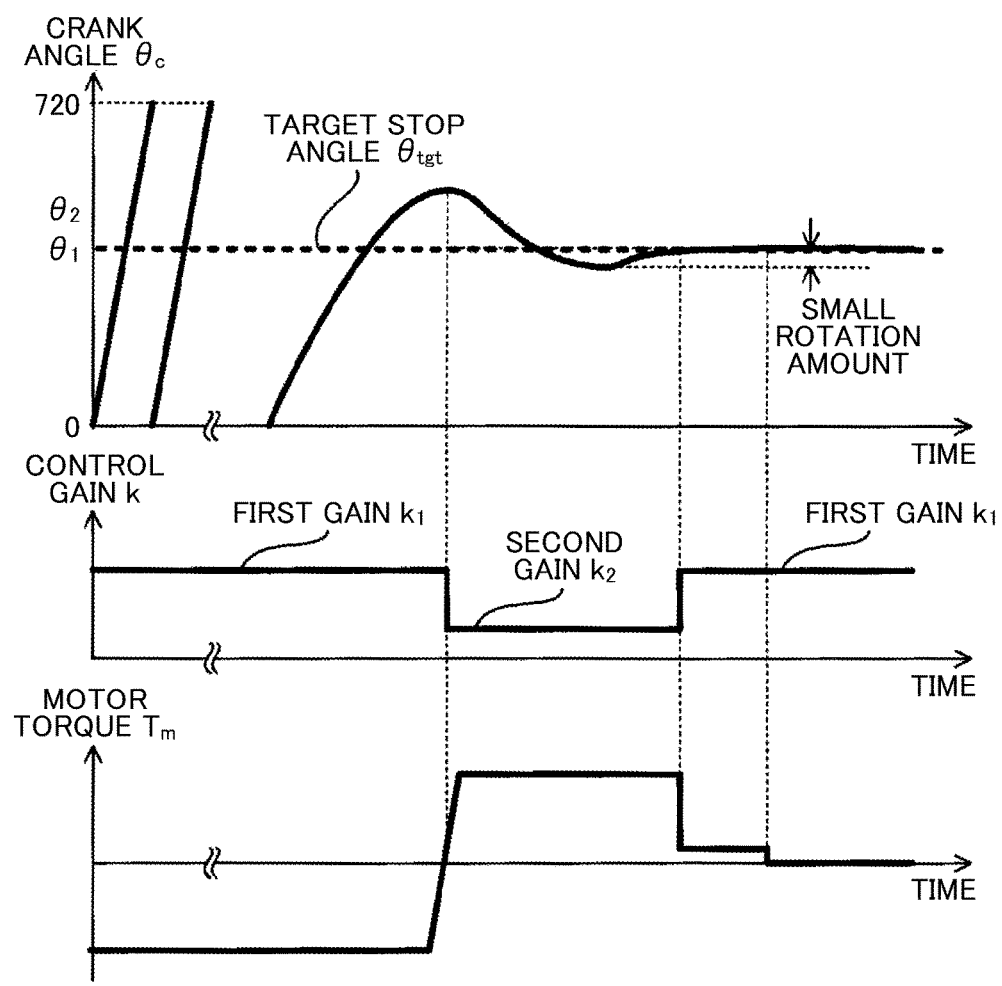
FIG. 13 is a timing chart showing the target stop angle, the crank angle and the torque in the case where the third example of the crank stop operation is carried out.

In this third example of the crank stop operation as well as the first example of the crank stop operation, the torque Tm that is output under the circumstances where the crankshaft rotates in the negative rotational direction is larger than in the case where the control gain k is held equal to the first gain $k_1$ (see FIG. 13). As a result, the rotation amount of the crankshaft in the negative rotational direction is small, so the amount of subsequent rotation of the crankshaft in the positive rotational direction is also small. Accordingly, the force that is applied to the piston from the air in the combustion chamber in such a manner as to push down the crankshaft is also small. Accordingly, the third example of the crank stop operation can appropriately receive an effect similar to the effect that can be received by the first example of the crank stop operation.

Incidentally, in the third example of the crank stop operation as well as the second example of the crank stop operation, the gradually changing second gain $k_2$ may be set as the control gain k. For example, the gradually increasing second gain $k_2$ may be set as the control gain k. For example, the gradually decreasing second gain $k_2$ may be set as the control gain k. For example, the second gain $k_2$ that gradually decreases and then gradually increases may be set as the control gain k. For example, the second gain $k_2$ that gradually increases and then gradually decreases may be set as the control gain k. Besides, in the third example of the crank stop operation as well as the first example of the crank stop operation, the target stop angle $\theta_{tgt}$ may be changed between the first angle $\theta_1$ and the second angle $\theta_2$.

According to the aforementioned configuration, during the second period in which the crankshaft rotates in the negative rotational direction with a view to returning the crank angle, which has exceeded the target angle, toward the target angle, the relatively large second angle is used as the target angle. Therefore, the rotation amount of the crankshaft in the negative rotational direction is smaller than in the case where the relatively small first angle is used as the target angle during the second period. As a result, the overshoot amount of the crank angle in the negative rotational direction with respect to the target angle is also small. Therefore, the rotation amount of the crankshaft in the positive rotational direction after a changeover in the rotational direction of the crankshaft from the negative rotational direction to the positive rotational direction is also small. Therefore, the moving amount of a piston resulting from this rotation in the positive rotational direction is also small, and the degree of compression (or expansion) of the air in the cylinder by the piston decreases. As a result, the force that is exerted on the piston by the air in the cylinder when the crankshaft is stopped is also small. Accordingly, the possibility of the piston moving (i.e., the crankshaft moving) as a result of a pressure of the air in the cylinder is low after the torque is stopped from being output due to the stop of the crankshaft. Therefore, the vehicle control apparatus according to the aforementioned configuration can stop the crankshaft with the crank angle equal to the target angle (i.e., the first angle), even in the case where an overshoot of the crank angle with respect to the target angle occurs as a result of the responsiveness of feedback control before stopping the crankshaft.

In addition, the target angle is returned from the second angle to the first angle at the first timing when the crank angle, which has become smaller than the first angle as a result of the responsiveness of feedback control, becomes equal to or larger than the first angle. Accordingly, the second angle that is larger than the first angle as the original target angle is not used as the target angle for a longer time than necessary. Therefore, the vehicle control apparatus according to the aforementioned configuration can stop the crankshaft with the crank angle equal to the target angle (i.e., the first angle).

According to the aforementioned configuration, the vehicle control apparatus can stop the crankshaft with the crank angle equal to the target angle (i.e., the first angle), even in the case where a state of rotation of the crankshaft in the negative rotational direction as a result of the responsiveness of feedback control occurs a plurality of times. In addition, the second angle that is larger than the first angle as the original target angle is not used as the target angle for a longer time than necessary, even in the case where a state of rotation of the crankshaft in the negative rotational direction as a result of the responsiveness of feedback control occurs a plurality of times. Therefore, the vehicle control apparatus according to the aforementioned configuration can stop the crankshaft with the crank angle equal to the target angle (i.e., the first angle).

According to the aforementioned configuration, the torque is prevented from rapidly changing when the target angle changes over from the first angle to the second angle or from the second angle to the first angle.

In the case where the angle that can be assumed by the crank angle in the latter half of the compression stroke is equal to the first angle, the force that is exerted on the piston by the air in the cylinder when the crankshaft is stopped is likely to be relatively large. Therefore, according to the aforementioned configuration, the effect of making it possible to lower the possibility of the piston moving as a result of the pressure of the air in the cylinder is more remarkable.

According to the aforementioned configuration, during the second period in which the crankshaft rotates in the negative rotational direction with a view to returning the crank angle, which has exceeded the target angle, toward the target angle, the relatively large torque in the positive rotational direction is output. Therefore, the rotation amount of the crankshaft in the negative rotational direction is smaller than in the case where the relatively small torque in the positive rotational direction is output during the second period. In consequence, the vehicle control apparatus according to the aforementioned configuration can receive an effect similar to the effect that can be received by the above-mentioned vehicle control apparatus according to the first aspect of the disclosure.

In addition, the motor gain is returned from the second gain to the first gain at the first timing when the crank angle, which has become smaller than the target angle as a result of the responsiveness of feedback control, becomes equal to or larger than the target angle. Accordingly, the second gain that is different from the first gain as the original motor gain is not used as the motor gain for a longer time than necessary. Therefore, the vehicle control apparatus according to the second aspect of the disclosure can stop the crankshaft with the crank angle equal to the target angle.

According to the aforementioned configuration, the vehicle control apparatus according to the second aspect of the disclosure can stop the crankshaft with the crank angle equal to the target angle, even in the case where a state of rotation of the crankshaft in the negative rotational direction as a result of the responsiveness of feedback control occurs a plurality of times. In addition, the second gain that is different from the first gain as the original motor gain is not used as the motor gain for a longer time than necessary, even in the case where a state of rotation of the crankshaft in the negative rotational direction as a result of the responsiveness of feedback control occurs a plurality of times. As a result, the vehicle control apparatus according to the aforementioned configuration can stop the crankshaft with the crank angle equal to the target angle.

According to the aforementioned configuration, the torque is prevented from rapidly changing when the motor gain changes over from the first gain to the second gain or from the second gain to the first gain.

According to the aforementioned configuration, the effect of the vehicle control apparatus, namely, the effect of making it possible to lower the possibility of the piston moving as a result of the pressure of the air in the cylinder is more remarkable.

Incidentally, the disclosure can be changed as appropriate within such a range as not to contradict the gist or concept of the disclosure that can be read from the claims and the entire specification. A vehicle control apparatus subjected to such a change is also included in the technical concept of the disclosure.

What is claimed is:

1. A vehicle control apparatus for a vehicle,
the vehicle including an engine and a motor,
   the engine including at least one cylinder, a valve and a crankshaft, the valve being configured to control flow of air out of and into the at least one cylinder, and
   the motor being configured to adjust a crank angle of the crankshaft by outputting a torque to the crankshaft,
the vehicle control apparatus comprising an electronic control unit configured to:
perform feedback control of the motor, during stop control of the engine, based on the crank angle such that the torque is output for stopping the crankshaft at a target angle corresponding to the crank angle at which the valve is in a closed-valve state;
detect a rotational direction of the crankshaft;
use a first angle as the target angle during a first period,
   the first period being a period from start of the feedback control to a timing of first detection of rotation of the crankshaft in a negative rotational direction for returning the crank angle, that has become larger than the target angle, toward the target angle, and
   the first angle corresponding to the crank angle at which the valve is in the closed-valve state;
use a second angle as the target angle during a second period,
   the second period being a period from lapse of the first period to a timing of detection of a changeover in a rotational direction of the crankshaft from the negative rotational direction to a positive rotational direction, and
   the second angle being larger than the first angle; and
return the target angle from the second angle to the first angle at a first timing,
   the first timing being a timing when the crank angle, which has become smaller than the first angle during the second period, becomes equal to or larger than the first angle after lapse of the second period.

2. The vehicle control apparatus according to claim 1, wherein
the electronic control unit is configured to use the second angle as the target angle during a third period,
the third period is a period from a timing of second detection of rotation of the crankshaft in the negative rotational direction for returning the crank angle, which has become larger than the target angle for a second time after returning the target angle to the first angle, toward the target angle to a timing of detection of a changeover in the rotational direction of the crankshaft from the negative rotational direction to the positive rotational direction,
the electronic control unit is configured to return the target angle from the second angle to the first angle at a second timing, and
the second timing is a timing when the crank angle, which has become smaller than the first angle during the third period, becomes equal to or larger than the first angle after lapse of the third period.

3. The vehicle control apparatus according to claim 1, wherein the second angle gradually increases from the first angle and then gradually decreases toward the first angle.

4. The vehicle control apparatus according to claim 1, wherein the first angle is the crank angle in a latter half of a compression stroke.

5. A vehicle control apparatus for a vehicle,
the vehicle including an engine and a motor,
   the engine including at least one cylinder, a valve and a crankshaft, the valve being configured to control flow of air out of and into the at least one cylinder, and
   the motor being configured to adjust a crank angle of the crankshaft by outputting a torque to the crankshaft,
the vehicle control apparatus comprising an electronic control unit configured to:
perform feedback control of the motor, during stop control of the engine, based on the crank angle such that the torque is output for stopping the crankshaft at a target angle corresponding to the crank angle at which the valve is in a closed-valve state;
detect a rotational direction of the crankshaft;
use a first gain, during a first period, as a motor gain that prescribes a magnitude of the torque,
   the first period being a period from start of the feedback control to a timing of first detection of rotation of the crankshaft in a negative rotational direction for returning the crank angle, which has become larger than the target angle, toward the target angle; use a second gain as the motor gain during a second period,
   the second period being a period from lapse of the first period to a timing of detection of a changeover in a rotational direction of the crankshaft from the negative rotational direction to a positive rotational direction, and
   the second gain being a gain that prescribes a larger torque in the positive rotational direction than the first gain; and
return the motor gain from the second gain to the first gain at a first timing,
   the first timing being a timing when the crank angle, which has become smaller than the target angle during the second period, becomes equal to or larger than the target angle after lapse of the second period.

6. The vehicle control apparatus according to claim 5, wherein
the electronic control unit is configured to use the second gain as the motor gain during a third period,
the third period is a period from a timing of second detection of rotation of the crankshaft in the negative rotational direction for returning the crank angle, which has become larger than the target angle for a second time after returning the motor gain to the first gain, toward the target angle to a timing of detection of a changeover in the rotational direction of the crankshaft from the negative rotational direction to the positive rotational direction,
the electronic control unit is configured to return the motor gain from the second gain to the first gain at a second timing, and
the second timing is a timing when the crank angle, that has become smaller than the target angle during the third period, becomes equal to or larger than the target angle after lapse of the third period.

7. The vehicle control apparatus according to claim 5, wherein the electronic control unit is configured to use the second gain as the motor gain during the second period, and the second gain is a gain that gradually increases from the first gain and then gradually decreases toward the first gain.

8. The vehicle control apparatus according to claim 5, wherein the electronic control unit is configured to use the second gain as the motor gain during the second period, and the second gain is a gain that gradually decreases from the first gain and then gradually increases toward the first gain.

9. The vehicle control apparatus according to claim 5, wherein the target angle is the crank angle in a latter half of a compression stroke.

10. A vehicle control method for a vehicle,
the vehicle including an engine, a motor and an electronic control unit,
the engine including at least one cylinder, a valve and a crankshaft, the valve being configured to control flow of air out of and into the at least one cylinder, and
the motor being configured to adjust a crank angle of the crankshaft by outputting a torque to the crankshaft,
the vehicle control method comprising:
performing, by the electronic control unit, feedback control of the motor, during stop control of the engine, based on the crank angle such that the torque is output for stopping the crankshaft at a target angle corresponding to the crank angle at which the valve is in a closed-valve state;
detecting a rotational direction of the crankshaft;
using, by the electronic control unit, a first angle as the target angle during a first period,
the first period being a period from start of the feedback control to a timing of first detection of rotation of the crankshaft in a negative rotational direction for returning the crank angle, which has become larger than the target angle, toward the target angle, and
the first angle corresponding to the crank angle at which the valve is in the closed-valve state;
using, by the electronic control unit, a second angle as the target angle during a second period,
the second period being a period from lapse of the first period to a timing of detection of a changeover in a rotational direction of the crankshaft from the negative rotational direction to a positive rotational direction, and
the second angle being larger than the first angle, and returning the target angle from the second angle to the first angle at a first timing,
the first timing being a timing when the crank angle, which has become smaller than the first angle during the second period, becomes equal to or larger than the first angle after lapse of the second period.

11. A vehicle control method for a vehicle,
the vehicle including an engine, a motor and an electronic control unit,
the engine including at least one cylinder, a valve and a crankshaft, the valve being configured to control flow of air out of and into the at least one cylinder, and
the motor being configured to adjust a crank angle of the crankshaft by outputting a torque to the crankshaft,
the vehicle control method comprising:
performing, by the electronic control unit, feedback control of the motor, during stop control of the engine, based on the crank angle such that the torque is output for stopping the crankshaft at a target angle corresponding to the crank angle at which the valve is in a closed-valve state;
detecting a rotational direction of the crankshaft;
using, by the electronic control unit, a first gain, during a first period, as a motor gain that prescribes a magnitude of the torque,
the first period being a period from start of the feedback control to a timing of first detection of rotation of the crankshaft in a negative rotational direction for returning the crank angle, which has become larger than the target angle, toward the target angle;
using, by the electronic control unit, a second gain as the motor gain during a second period,
the second period being a period from lapse of the first period to a timing of detection of a changeover in a rotational direction of the crankshaft from the negative rotational direction to a positive rotational direction, and
the second gain being a gain that prescribes a larger torque in the positive rotational direction than the first gain; and
returning the motor gain from the second gain to the first gain at a first timing,
the first timing being a timing when the crank angle, which has become smaller than the target angle during the second period, becomes equal to or larger than the target angle after lapse of the second period.

* * * * *